United States Patent [19]

Nomura

[11] Patent Number: 6,023,655
[45] Date of Patent: Feb. 8, 2000

[54] MAP DATABASE APPARATUS

[75] Inventor: Takashi Nomura, Chigasaki, Japan

[73] Assignee: Xanavi Informatics Corporation, Kanagawa, Japan

[21] Appl. No.: 09/333,951

[22] Filed: Jun. 16, 1999

Related U.S. Application Data

[63] Continuation of application No. PCT/JP97/00004, Dec. 16, 1997.

[30] Foreign Application Priority Data

Dec. 16, 1996 [JP] Japan .................................. 8-335250

[51] Int. Cl.$^7$ .................................................. G06F 165/00
[52] U.S. Cl. .......................... 701/208; 701/207; 701/209; 701/212; 340/990
[58] Field of Search ..................................... 701/200, 201, 701/202, 206, 207, 208, 209, 210, 211, 212; 340/988, 990, 995; 73/178 R

[56] References Cited

U.S. PATENT DOCUMENTS

| | | | |
|---|---|---|---|
| 5,036,471 | 7/1991 | Tamura et al. | 701/209 |
| 5,161,886 | 11/1992 | De Jong et al. | 701/209 |
| 5,204,817 | 4/1993 | Yoshida | 701/209 |
| 5,410,485 | 4/1995 | Ichikawa | 701/209 |
| 5,513,110 | 4/1996 | Fujita et al. | 701/207 |
| 5,523,765 | 6/1996 | Ichikawa | 701/213 |

FOREIGN PATENT DOCUMENTS

| | | |
|---|---|---|
| 7-243859 | 2/1995 | Japan . |
| 7-37073 | 2/1995 | Japan . |
| 7-98799 | 4/1995 | Japan . |
| 8-327386 | 12/1996 | Japan . |

Primary Examiner—William A. Cuchlinski, Jr.
Assistant Examiner—Gertrude Arthur
Attorney, Agent, or Firm—Evenson, McKeown, Edwards & Lenahan, PLLC

[57] ABSTRACT

In a map database apparatus in which a road is expressed by using a plurality of sets of data related to links each of which links has nodes at a front end and at a rear end, data related to a plurality of links provided separately for maps at different scales are respectively stored as roadmap data from a highest order level at a smallest scale through a lowest order level at a largest scale, a map area at a high order level is divided into a plurality of M small areas, each of sets of detail information corresponding to the M small areas is stored as a set of roadmap data of a map area at a low order level, and M sets of roadmap data are stored at the low order level: correspondence information between nodes at different levels when the low order level is viewed from the high order level is provided as level correspondence data that express corresponding relationships between roadmap data at the high order level at the small scale and roadmap data at the low order level at the large scale.

12 Claims, 28 Drawing Sheets

FIG. 4

| | ITEM | NAME |
|---|---|---|
| LINK STRING 1 | LINK STRING INFORMATION | LINK STRING SIZE |
| | | NUMBER OF ELEMENT POINTS |
| | | LINK ATTRIBUTE |
| | | ROAD NAME OFFSET |
| | | ROAD NUMBER |
| | NODE LINK INFORMATION | ATTRIBUTE 1 + X COORDINATE |
| | | ATTRIBUTE 2 + Y COORDINATE |
| | | IDENTICAL NODE OFFSET |
| | | GUIDE OFFSET |
| | | LINK NUMBER |
| | | ATTRIBUTE 1 + X COORDINATE |
| | | ATTRIBUTE 2 + Y COORDINATE |
| | | IDENTICAL NODE OFFSET |
| | | GUIDE OFFSET |
| | | LINK NUMBER |
| | | ALTITUDE INFORMATION |
| | | ALTITUDE INFORMATION |
| LINK STRING n | LINK STRING INFORMATION | |
| | NODE LINK INFORMATION | |

FIG. 9A

| ATTRIBUTE 1 + X COORDINATE | ATTRIBUTE 2 + Y COORDINATE |
|---|---|

(2 WORDS)

FIG. 9B

| ATTRIBUTE 1 + X COORDINATE | ATTRIBUTE 2 + Y COORDINATE | IDENTICAL NODE OFFSET |
|---|---|---|

(3 WORDS)

FIG. 9C

| ATTRIBUTE 1 + X COORDINATE | ATTRIBUTE 2 + Y COORDINATE | IDENTICAL NODE OFFSET | GUIDE OFFSET (OR LINK NO.) |
|---|---|---|---|

(4 WORDS)

FIG. 9D

| ATTRIBUTE 1 + X COORDINATE | ATTRIBUTE 2 + Y COORDINATE | IDENTICAL NODE OFFSET | GUIDE OFFSET | LINK NO. |
|---|---|---|---|---|

(5 WORDS)

FIG. 10A

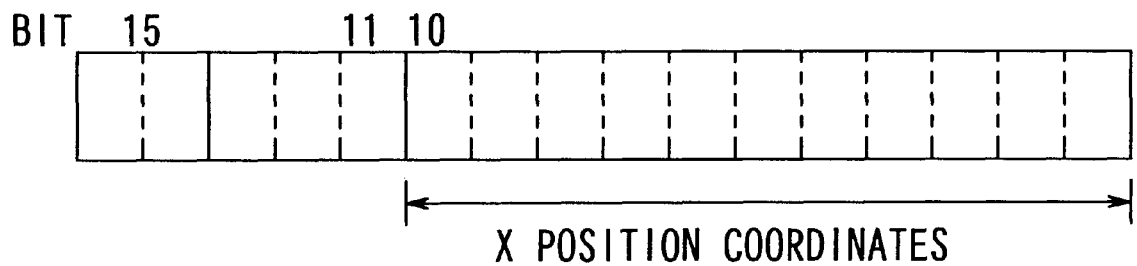

BIT 15　　11 10

X POSITION COORDINATES

FIG. 10B

| BIT | DETAILS | |
|---|---|---|
| 15, 14 | OFFSET TO IMMEDIATLY PRECEDING | (1) 2 WORDS UP TO THE HEADER POSITION OF THE IMMEDIATELY PRECEDING ELEMENT POINT |
| | | (2) 3 WORDS UP TO THE HEADER POSITION OF THE IMMEDIATELY PRECEDING ELEMENT POINT |
| | | (3) 4 WORDS UP TO THE HEADER POSITION OF THE IMMEDIATELY PRECEDING ELEMENT POINT |
| | | (4) 5 WORDS UP TO THE HEADER POSITION OF THE IMMEDIATELY PRECEDING ELEMENT POINT |

FIG. 11B

| BIT | DETAILS | |
|---|---|---|
| 15 - 11 | ONE-WAY TRAFFIC | ① NO ONE-WAY ROAD |
| | | ② ONE-WAY TRAFFIC IN FORWARD DIRECTION *1 |
| | | ③ ONE-WAY TRAFFIC IN REVERSE DIRECTION *2 |
| | | ④ NO TRAFFIC IN BOTH DIRECTIONS *3 |
| | CLASSIFICATIONS OF WIDTHS *4 | ⑤ LESS THAN 5.5m OR NOT KNOWN |
| | | ⑥ 5.5 THROUGH 13m (OR ONE THROUGH 2 LANES) |
| | | ⑦ 13m OR MORE (OR THREE THROUGH 4 LANES) |
| | | ⑧ 5 THROUGH 6 LANES OR MORE |

*1  1-WAY TRAFFIC IN THE FORWARD DIRECTION MEANS THAT TRAVELING IS ALLOWED ONLY IN THE DIRECTION WHICH CONFORMS TO THE ORDER IN WHICH LINK STRING DATA POINTS ARISE.

*2  1-WAY TRAFFIC IN THE REVERSE DIRECTION MEANS THAT TRAVELING IS ALLOWED ONLY IN THE DIRECTION WHICH IS REVERSE FROM THE ORDER IN WHICH LINK STRING DATA POINTS ARISE.

*3  NO TRAFFIC ALLOWED IN BOTH DIRECTIONS MEANS THAT TRAVELING IS NOT ALLOWED EITHER IN THE DIRECTION CONFORMING TO THE ORDER IN WHICH THE LINK STRING DATA POINTS ARISE OR IN THE DIRECTION THAT IS REVERSE.

*4  THE TOTAL NUMBER OF LANES FOR BOTH FORWARD AND REVERSE DIRECTIONS IS INDICATED AS THE NUMBER OF LANES. WHEN FORWARD DIRECTION LANES AND REVERSE DIRECTION LANES ARE SEPARATED, THE NUMBER OF LANES IS INDICATED SEPARATELY FOR THE FORWARD DIRECTION AND REVERSE DIRECTION.

STRUCTURE OF ROUTE SEARCH DATA

FIG. 13

LEVEL CORRESPONDENCE DATA FOR ROUTE SEARCH

| | ITEM | |
|---|---|---|
| | LEVEL CORRESPONDENCE DATA HEADER | CHECK DIGIT+TOTAL NUMBER OF LEVEL CORRESPONDING NODES |
| CORRESPONDENCE INFORMATION 1 | CURRENT NODE CORRESPONDING INFORMATION | NUMBER OF ADJACENT NODES |
| | | CURRENT LEVEL INFORMATION |
| | | LOW ORDER LEVEL INFORMATION |
| | INFORMATION ON ADJACENT NODE #1 | CURRENT LEVEL ADJACENT INFORMATION |
| | | LOW ORDER LEVEL ADJACENT INFORMATION |
| | INFORMATION ON ADJACENT NODE #2 | CURRENT LEVEL ADJACENT INFORMATION |
| | | LOW ORDER LEVEL ADJACENT INFORMATION |
| | ⋮ | |
| | INFORMATION ON ADJACENT NODE #n | CURRENT LEVEL ADJACENT INFORMATION |
| | | LOW ORDER LEVEL ADJACENT INFORMATION |
| CORRESPONDENCE INFORMATION 2 | CURRENT NODE CORRESPONDING INFORMATION | NUMBER OF ADJACENT NODES |
| | | CURRENT LEVEL INFORMATION |
| | | LOW ORDER LEVEL INFORMATION |
| | INFORMATION ON ADJACENT NODE #1 | CURRENT LEVEL ADJACENT INFORMATION |
| | | LOW ORDER LEVEL ADJACENT INFORMATION |
| | INFORMATION ON ADJACENT NODE #2 | CURRENT LEVEL ADJACENT INFORMATION |
| | | LOW ORDER LEVEL ADJACENT INFORMATION |
| | ⋮ | |
| | INFORMATION ON ADJACENT NODE #p | CURRENT LEVEL ADJACENT INFORMATION |
| | | LOW ORDER LEVEL ADJACENT INFORMATION |
| ⋮ | | |
| CORRESPONDENCE INFORMAITON i | CURRENT NODE CORRESPONDING INFORMATION | NUMBER OF ADJACENT NODES |
| | | CURRENT LEVEL INFORMATION |
| | | LOW ORDER LEVEL INFORMATION |
| | INFORMATION ON ADJACENT NODE #1 | CURRENT LEVEL ADJACENT INFORMATION |
| | | LOW ORDER LEVEL ADJACENT INFORMATION |
| | INFORMATION ON ADJACENT NODE #2 | CURRENT LEVEL ADJACENT INFORMATION |
| | | LOW ORDER LEVEL ADJACENT INFORMATION |
| | ⋮ | |
| | INFORMATION ON ADJACENT NODE #r | CURRENT LEVEL ADJACENT INFORMATION |
| | | LOW ORDER LEVEL ADJACENT INFORMATION |
| | MESH CODE | |

| CURRENT LEVEL NODE NUMBER | | 1000 |
|---|---|---|
| LOW ORDER LEVEL | NODE NUMBER | 230 |
| | DIVIDED SMALL AREA NUMBER | A060 |
| CURRENT LEVEL NODE NUMBER | | 1100 |
| LOW ORDER LEVEL | NODE NUMBER | 231 |
| | DIVIDED SMALL AREA NUMBER | A060 |
| CURRENT LEVEL NODE NUMBER | | 1200 |
| LOW ORDER LEVEL | NODE NUMBER | 302 |
| | DIVIDED SMALL AREA NUMBER | A060 |
| ⋮ | | |
| CURRENT LEVEL NODE NUMBER | | 1300 |
| LOW ORDER LEVEL | NODE NUMBER | 354 |
| | DIVIDED SMALL AREA NUMBER | A060 |

FIG. 14A

| ... <br> ... | ... <br> ... | ... <br> ... | (C0, C0) |
|---|---|---|---|
| ... <br> ... | ... <br> ... | ... <br> ... | ... <br> ... |
| (40, 00) <br> ... | (40, 40) <br> ... | ... <br> ... | ... <br> ... |
| (00, 00) <br> 0, 1 | (00, 40) <br> 0, 1, 2 | (00, 80) <br> 0, 1, 2, 3 | (00, C0) <br> 0, 1 |

| | DIVIDED SMALL AREA NUMBER | NODE NO. |
|---|---|---|
| CURRENT NODE CORRESPONDENCE INFORMATION | (00, 00) | 0 |
| ADJACENT NODE INFORMATION | ⋮ | |
| CURRENT NODE CORRESPONDENCE INFORMATION | (00, 00) | 1 |
| ADJACENT NODE INFORMATION | ⋮ | |
| CURRENT NODE CORRESPONDENCE INFORMATION | (00, 40) | 0 |
| ADJACENT NODE INFORMATION | ⋮ | |
| CURRENT NODE CORRESPONDENCE INFORMATION | (00, 40) | 1 |
| ADJACENT NODE INFORMATION | ⋮ | |
| CURRENT NODE CORRESPONDENCE INFORMATION | (00, 40) | 2 |
| ⋮ | ⋮ | |

FIG. 15

| LEVEL | NUMBER OF DIVISIONS | ADOPTED LONGITUDINAL DIRECTION CODE | ADOPTED LATITUDINAL DIRECTION CODE |
|---|---|---|---|
| LEVEL n+4 | 1 | — | — |
| LEVEL n+3 | 16 (4×4) | 00h, 40h, 80h, C0h | 00h, 40h, 80h, C0h |
| LEVEL n+2 | 256 (16×16) | 00h, 10h, 20h, 30h, ··· | 00h, 10h, 20h, 30h, ··· |
| LEVEL n+1 | 4096 (64×64) | 00h, 04h, 08h, 0Ch, ··· | 00h, 04h, 08h, 0Ch, ··· |
| LEVEL n | 65536 (256×256) | 00h, 01h, 02h, 03h, ··· | 00h, 01h, 02h, 03h, ··· |

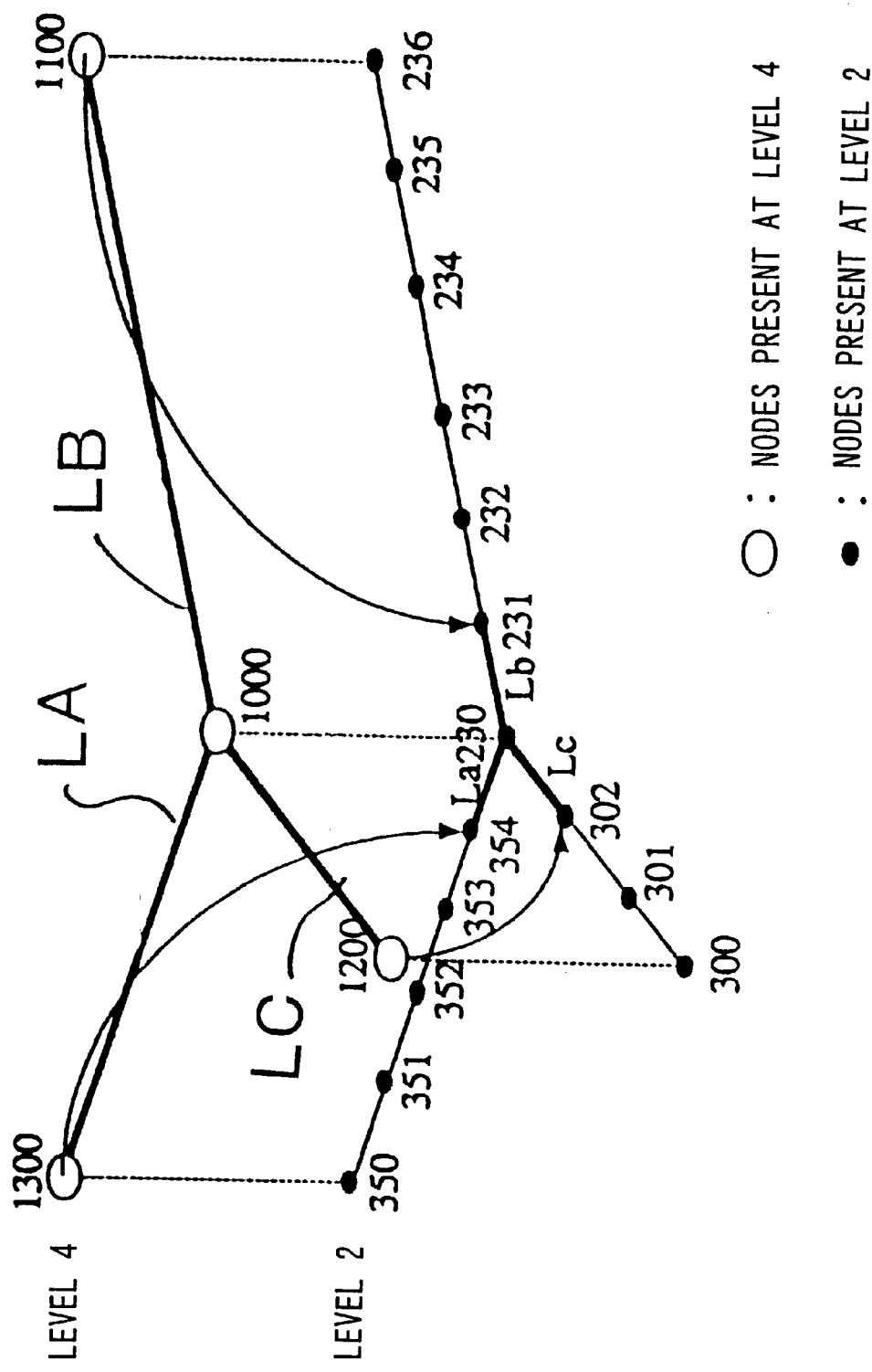

FIG. 17

| CORRESPONDENCE INFORMATION 1 | CURRENT NODE CORRESPONDENCE INFORMATION | CURRENT LEVEL NODE NUMBER | | 1000 |
|---|---|---|---|---|
| | | LOW ORDER LEVEL | NODE NUMBER | 230 |
| | | | DIVIDED SMALL AREA NUMBER | A060 |
| | INFORMATION ON ADJACENT NODE #1 | CURRENT LEVEL NODE NUMBER | | 1100 |
| | | LOW ORDER LEVEL | NODE NUMBER | 231 |
| | | | DIVIDED SMALL AREA NUMBER | A060 |
| | ⋮ | ⋮ | | |
| | INFORMATION ON ADJACENT NODE #3 | CURRENT LEVEL NODE NUMBER | | 1300 |
| | | LOW ORDER LEVEL | NODE NUMBER | 354 |
| | | | DIVIDED SMALL AREA NUMBER | A060 |

STRUCTURE OF RECOMMENDED ROUTE DATA

NODE INFORMATION AND LINK INFORMATION IN RECOMMENDED ROUTE DATA

MAP DATABASE APPARATUS

This application is a continuation of PCT application Ser. No. PCT/JP97/04621 filed on Dec. 16, 1997.

TECHNICAL FIELD

The present invention relates to a map database apparatus that is preferably mounted at a navigation system for vehicles or the like and is employed in roadmap display, map matching, calculation of a recommended route and the like.

BACKGROUND ART

Vehicular navigation systems in the known art are provided with a function for displaying a roadmap of the area where the vehicle is currently located, a function for accurately detecting the vehicle position through map matching, a function for calculating a recommended route from a point of departure to a destination and the like. In these vehicular navigation systems in the prior art, roadmap display data, data for map matching and data for route search are separately stored in a CD ROM in order to maintain compatibility with existing software programs and also to improve the processing speed.

The roadmap display data include widest range map data for displaying large areas at the smallest scale, most detailed map data for displaying small areas in detail at the largest scale and a plurality of sets of map data at different scales between that of the widest range map data and that of the most detailed map data. For instance, the widest range map data may be referred to as level 4 data, the most detailed map data may be referred to as level 1 data and the sets of data at scales between those of the level 4 data and the level 1 data may be referred to as level 3 data and level 2 data.

FIG. 23 illustrates roadmaps corresponding to the roadmap display data that are stored in memory as the level 4, level 3 and level 2 roadmap display data as explained above. In the CD ROM, the level 4 roadmap display data, the level 3 roadmap display data and the level 2 roadmap display data are stored separately. FIG. 23 shows a roadmap corresponding to one of the meshes, i.e., the mesh M4, at level 4, and in the mesh M4, a road D1, a road D2 that is connected to an intersection n3 of the road D1 and two roads D3 and D4 that are connected at intersections n1 and n2 at the two ends of the road D1 respectively are present. The hatched small area m3 which is achieved by dividing the one mesh M4 at level 4 into sixteen equal portions constitutes one mesh M3 at level 3 and, as shown in FIG. 23, only portions of the roads D1 and D2 are present in the mesh M3. The hatched small area m2, which is achieved by dividing the mesh M3 at level 3 into sixteen equal portions constitutes one mesh M2 at level 2 and, as shown in FIG. 23, portions of the roads D1 and D2 and roads D5 and D6, which are connected to the road D1 are present in the mesh M2.

In a navigation system with a recommended route search function, route search data are provided as well as the roadmap data described above. Since information on the road forms are not required in route search, the route search data include data on a given node (referred to as the current node in this specification) and nodes connected to the node (referred to as adjacent nodes in this specification). The node data include positional coordinates of the nodes.

For instance, two sets of route search data that correspond to the level 4 roadmap data and the level 2 roadmap data may be provided so that the vicinity of the point of departure and the vicinity of the destination are searched at level 2 in route search and so that the other areas are searched at level 4, to reduce the length of route search time.

In the prior art explained above, it is required that nodes at a high order level and at a low order level be made to correspond with each other with a high degree of efficiency requiring only a small memory capacity and with a high degree of reliability.

DISCLOSURE OF THE INVENTION

An object of the present invention is to provide a map database apparatus that is capable of making data related to a given road correspond at different levels with a high degree of reliability and requiring only a small memory capacity.

In order to attain the above object, in a map database apparatus in which a road is expressed by using a plurality of sets of data related to links each of which links has nodes at a front end and at a rear end, data related to a plurality of links provided separately for maps at different scales are respectively stored as roadmap data from a highest order level at a smallest scale through a lowest order level at a largest scale, a map area at a high order level is divided into a plurality of M small areas, each of sets of detail information corresponding to the M small areas is stored as a set of roadmap data of a map area at a low order level, and M sets of roadmap data are stored at the low order level: correspondence information between nodes at different levels when the low order level is viewed from the high order level is provided as level correspondence data that express corresponding relationships between roadmap data at the high order level at the small scale and roadmap data at the low order level at the large scale.

In other aspect, the level correspondence data are route search data that are provided with a number assigned to a high order adjacent node that is adjacent to a current node at a high order level and a number assigned to a low order adjacent node that is adjacent to the current node at a low order level corresponding to the current node at the high order level made to correspond with each other.

BRIEF DESCRIPTION OF THE DRAWINGS

FIG. 4 shows the structure of roadmap display data.

FIGS. 9A through 9D show different data lengths of node information and interpolation point information.

FIGS. 10A and 10B show an example of attribute 1+X coordinate data.

FIGS. 11A and 11B show an example of attribute 2+Y coordinate data.

FIG. 13 illustrates the data structure of the level correspondence data for route search.

FIGS. 14A and 14B illustrate current node correspondence information and adjacent node correspondence information.

FIG. 15 illustrates the number of divisions (meshes) at each level and codes for specifying the meshes FIG. 16 illustrates a current node and adjacent nodes at level 4 and level 2

FIG. 17 shows an example of level correspondence data in FIG. 16

BEST MODE FOR CARRYING OUT THE INVENTION

Figure 1:
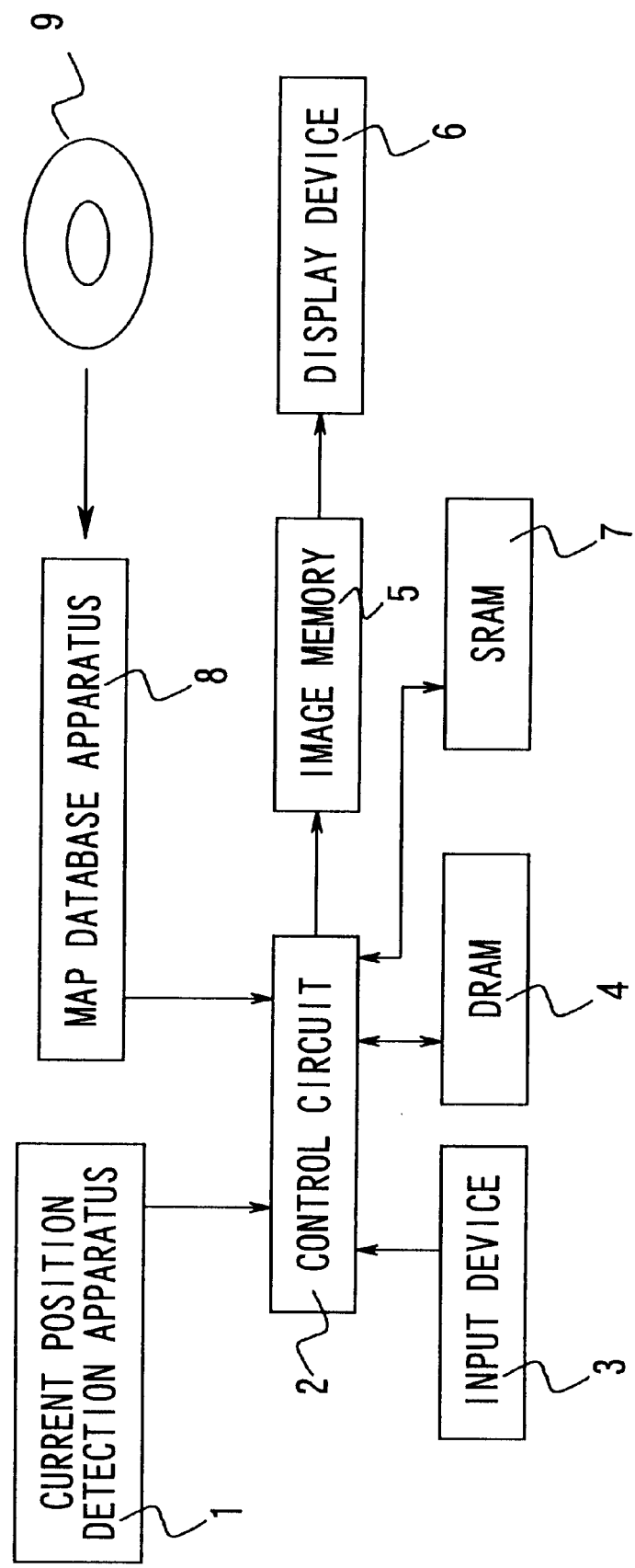
FIG. 1 shows a block diagram of an embodiment of a navigation system for vehicles according to the present invention.

FIG. 1 is a block diagram of an embodiment of a navigation system for vehicles that is internally provided with a map database apparatus according to the present invention. In FIG. 1, reference number 1 indicates a current position detection apparatus that detects the current position of a vehicle, which is constituted with, for instance, an azimuth sensor that detects the bearing of the vehicle while traveling, a vehicle speed sensor that detects the speed of the vehicle, a GPS sensor that detects a GPS signal from a GPS (Global Positioning System) satellite and the like.

Reference number 2 indicates a control circuit that controls the entire system and is constituted with a microprocessor and peripheral circuits. Reference number 3 indicates an input device for inputting destinations and the like for vehicles, reference number 4 indicates a DRAM that stores vehicle position information and the like detected by the current position detection apparatus 1, reference number 5 is an image memory that stores image data for display on a display device 6 and image data stored in the image memory 5 are read out as necessary to be displayed on the display device 6. Reference number 7 indicates an SRAM that stores node information, link information and the like on the recommended route calculated by the control circuit 2.

Reference number 8 indicates a map database apparatus that stores various types of data for performing roadmap display, route search, map matching and the like, which is constituted with, for instance, a CD-ROM device, a magnetic recording device and the like. Reference number 9 indicates a recording medium, in which the above data are recorded, that is loaded into this map database apparatus, for instance a CD-ROM. If the map database apparatus is just referred, the map database apparatus includes the recording medium. In the map database apparatus 8, map display data that constitute information related to road physical forms, road classifications and the like, and route search data that constitute branching point information, intersection information and the like that are not directly related to road physical forms, are stored. The map display data are mainly used when displaying a roadmap on the display device 6 and the route search data are mainly used when calculating a recommended route.

Next, the data structures of the map display data and the route search data stored in the map database apparatus 8 are described.

[1] Map display data (1) Overview of link string data

Figure 2:
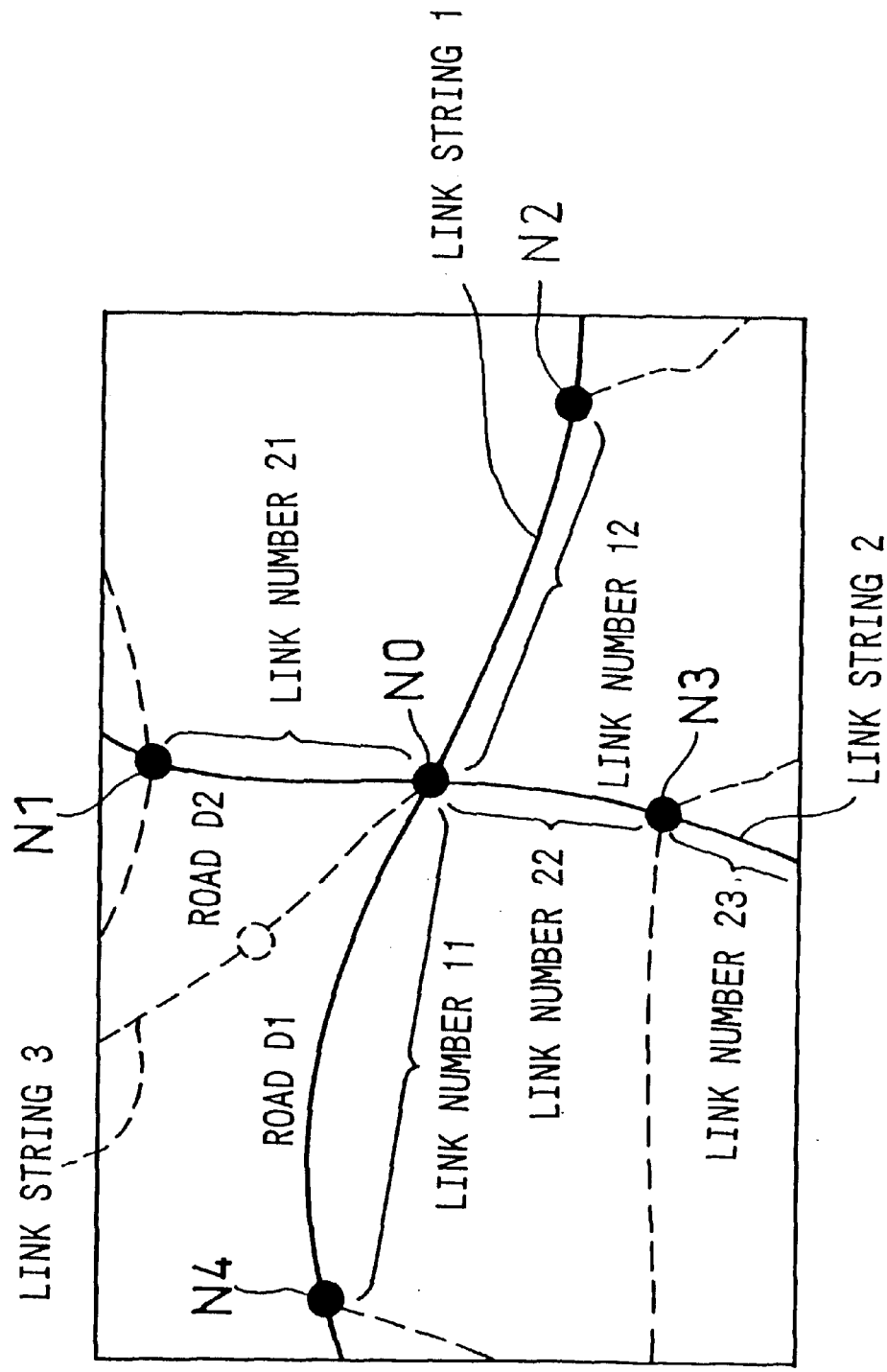
FIG. 2 shows an example of two roads intersecting within a mesh range.

Data management of the map display data in this embodiment is performed for each mesh range representing one of the partitioned areas achieved by dividing a roadmap into specific ranges, and individual roads present in a mesh range constitute separate link strings. For instance, as shown in FIG. 2, when two roads D1 and D2 intersect in one mesh range, the two roads constitute separate link strings 1 and 2, with the link string 1 comprising links 11 and 12 and the link string 2 comprising links 21–23. In this example, the links in the link string 1 and the links in the link string 2 represent roads of the same type. A link is the minimum unit that can represent a road and, in FIG. 2, the segment between the intersections constitutes one link unit, with inherent numbers assigned to the individual links (hereafter referred to as link numbers) for identification. The intersections in FIG. 2, i.e., the connection points of the individual links are expressed as nodes N0~N4. Nodes also constitute the start points and the end points of the individual links and, as detailed later, interpolation points that further divide the segments between nodes may sometimes be provided as well.

Figure 3:
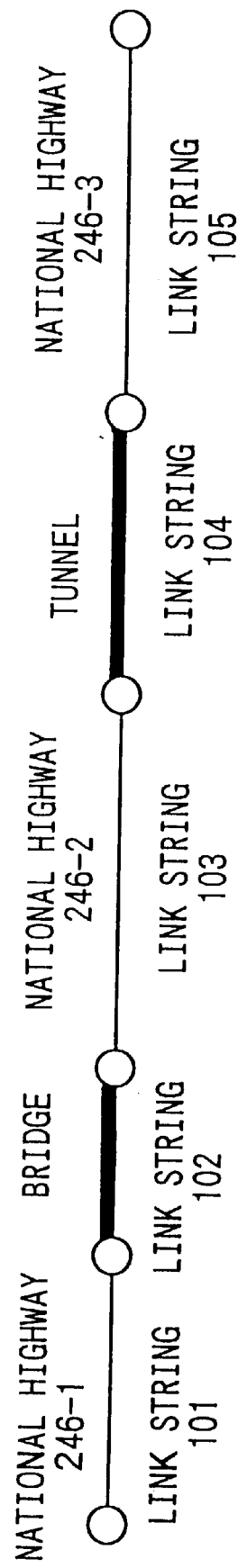
FIG. 3 shows a diagram illustrating link string data.

Also, in this embodiment, when there is a distinct structure such as a bridge, a tunnel or the like, on a road, the portions of the road preceding and following the structure constitute separate link strings. For instance, when there is a bridge and a tunnel on National Highway 246, as shown in FIG. 3, the portions preceding the bridge and the tunnel, the blocks corresponding to the bridge and the tunnel and the portions following the bridge and the tunnel all constitute separate link strings. In FIG. 3, these strings are designated as link strings 101–105. By making the portions preceding and following a distinctive structure on a road separate link strings, search of bridges, tunnels and the like on a roadmap is facilitated.

The map display data comprise a plurality of sets of data at different scales. In the explanation of this embodiment, the data at each scale are referred to as level n (n may be 1~4, for instance) data. Level 1 corresponds to the most detailed roadmap and as the level goes up, a roadmap over a wider range is presented at a smaller scale.

(2) Data structure of link string data

To give an explanation of the roads in FIG. 2, the map display data are structured by providing sets of link string data, each including various types of information related to the link string 1 or 2-n, for individual link strings, as shown in FIG. 4, and the data corresponding to each link string include link string information and node link information, with the link string information comprising the following types of data, as shown in FIG. 4.

Figure 5:
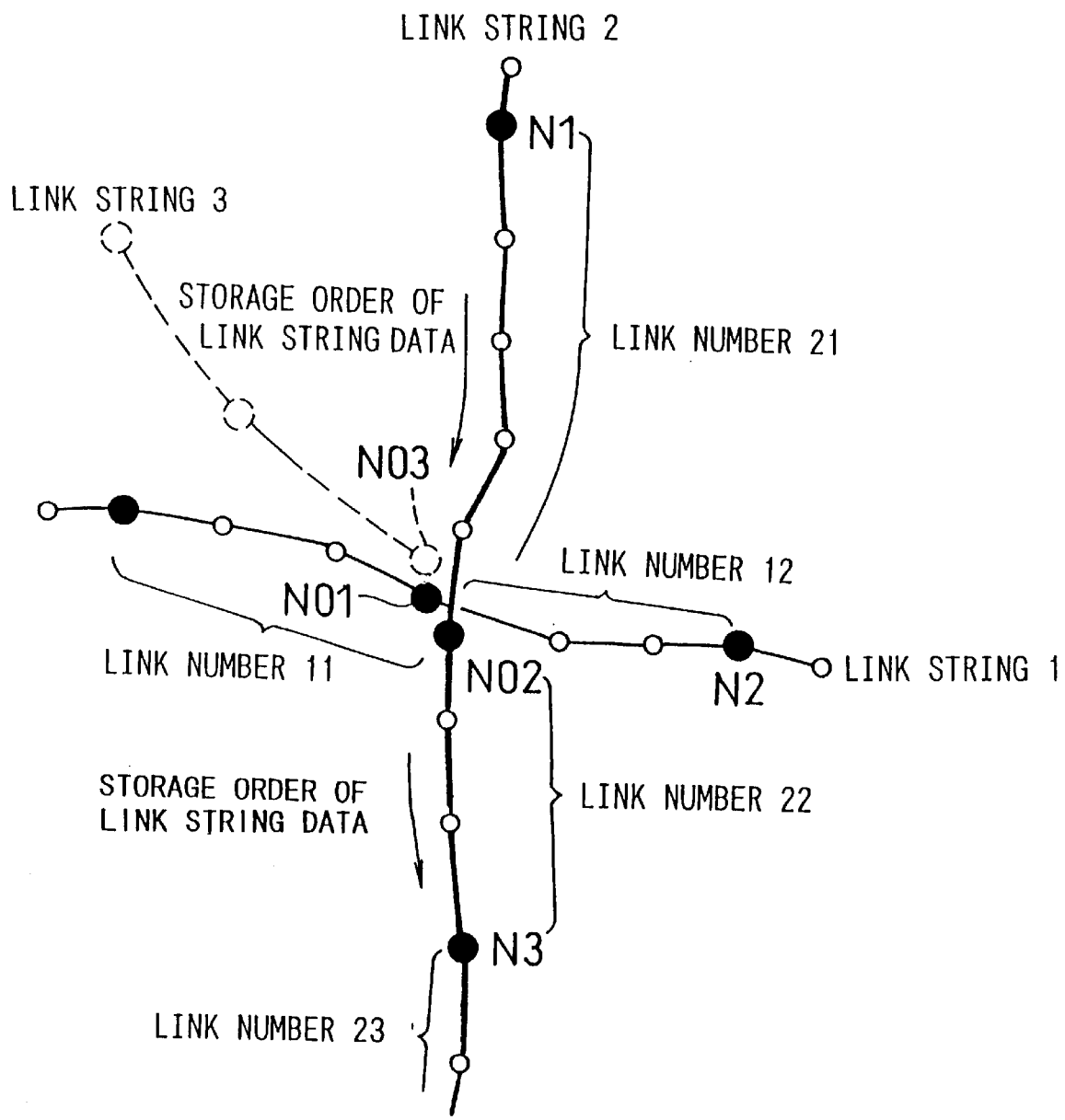
FIG. 5 shows an example of a roadmap with a plurality of nodes and a plurality of interpolation points.
Figure 6:
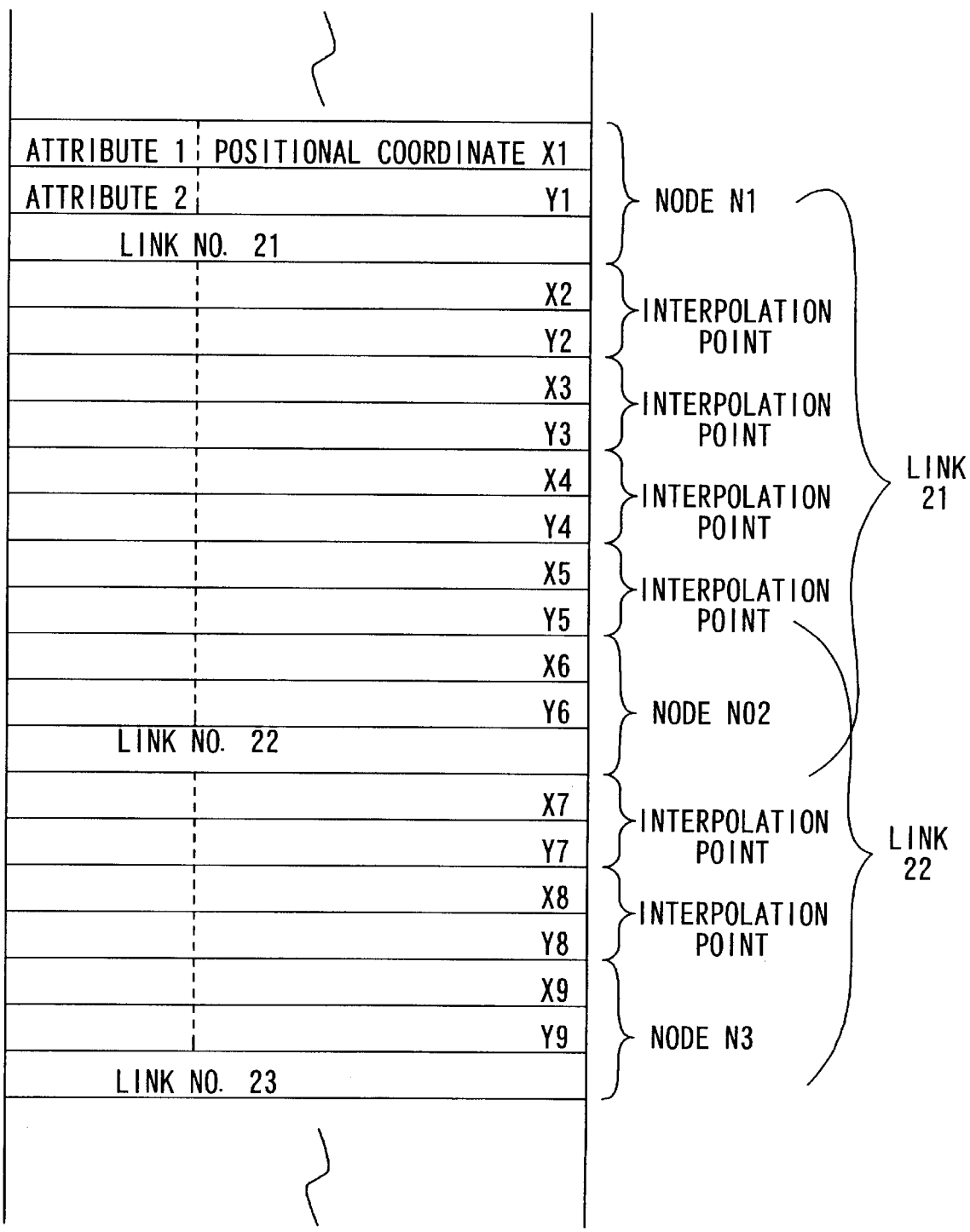
FIG. 6 shows a diagram illustrating the link string data corresponding to the road indicated with the bold line in FIG. 5.

1 link string size 2 number of element points 3 link attribute 4 road name offset 5 road number In addition, the node link information comprises the following types of data, as shown in FIG. 4.
1 attribute 1+X coordinate
2 attribute 2+Y coordinate
3 identical node offset
4 guide offset
5 link number
6 altitude information
(3) Link string information In FIG. 4, the link string size represents the length of the link string data. The number of element points data indicate the total number of node points and interpolation points, the link attribute data indicate the type of road, such as a national highway, a prefectural road, an expressway or the like and the road number is the actual designation number assigned to a national highway or prefectural road. The explanation of the road name offset is omitted since it is not relevant to this embodiment. The interpolation points are to be explained later.
(4) Node link information FIG. 5 shows the link strings 1 and 2 in FIG. 2 in more detail. For instance, the node link information of the link string 2 indicated with the bold line in FIG. 5 is as shown in FIG. 6. As shown in the figure, the data on the link string 2 include node information related to nodes N1, N02 and N3 (filled circles in FIG. 5) on the link string and interpolation point information related to the interpolation points (outline circles in FIG. 5). The node information includes positional X and Y coordinates of the node, the attribute and the link numbers of links connected to the node, whereas the interpolation point information includes the positional X and Y coordinates of the interpolation point. These positional coordinates are used as physical form data for recommended route display or physical form data for map matching, to be detailed later. The link string 2 indicated with the bold line in FIG. 5 includes a link assigned with a link number 21 located between the nodes N1 and N02, a link assigned with a link number 22 located between the nodes N02 and N3 and a link assigned with a link number 23 connected to the node N3. As is obvious from FIG. 6, the node information on the node N02 is shared by the link with link number 21 and the link with link number 22. The node information and the interpolation point information are positioned in the data structure in the order in which the links are connected. Thus, by sequentially reading out the link string data starting with the front end address, the road physical form, the road type and the like of the overall link string can be detected.

Figure 24:
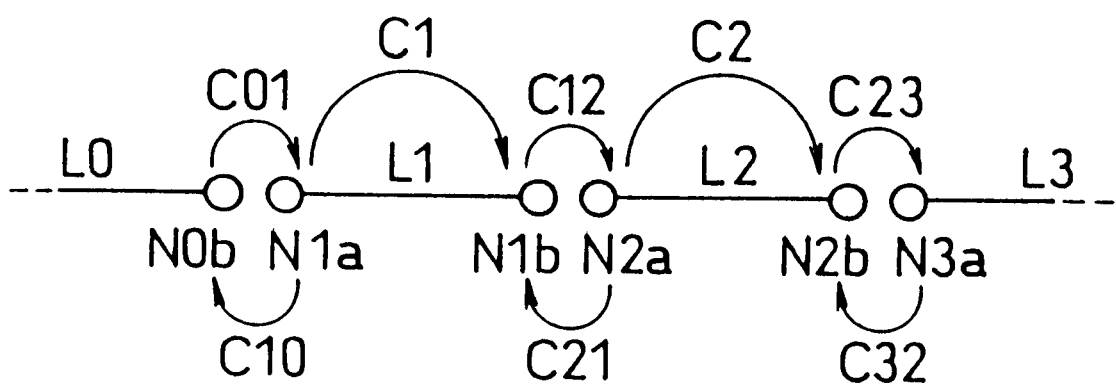
FIG. 24 shows an example of link data and node data in the prior art.

As has been explained, since, in this embodiment, data are managed in units of link strings within one mesh range and nodes between adjacent links are shared by the adjacent links, the entire volume of the data can be reduced compared to the case in which the data are managed in units of links, as in the example of the prior art shown in FIG. 24. In FIG. 24, links L0–L3 have nodes N0*b*, N1*a*, N1*b* . . . N3*a* at their start points and end points and sets of identical node information C01, C10 . . . for indicating identical nodes are provided as connection information for the individual nodes.
(5) Offset indicating an identical node In FIG. 5, of the nodes at the intersection of the link string 1 and the link string 2, the node in the link string 1 is assigned with a reference number N01, the node in the link string 2 is assigned with a reference number N02 and the node in the link string 3 is assigned with a reference number N03. In the data structure, the sets of node information corresponding to the intersecting points N01~N03 each has a data item referred to as an identical node offset.

Figure 7:
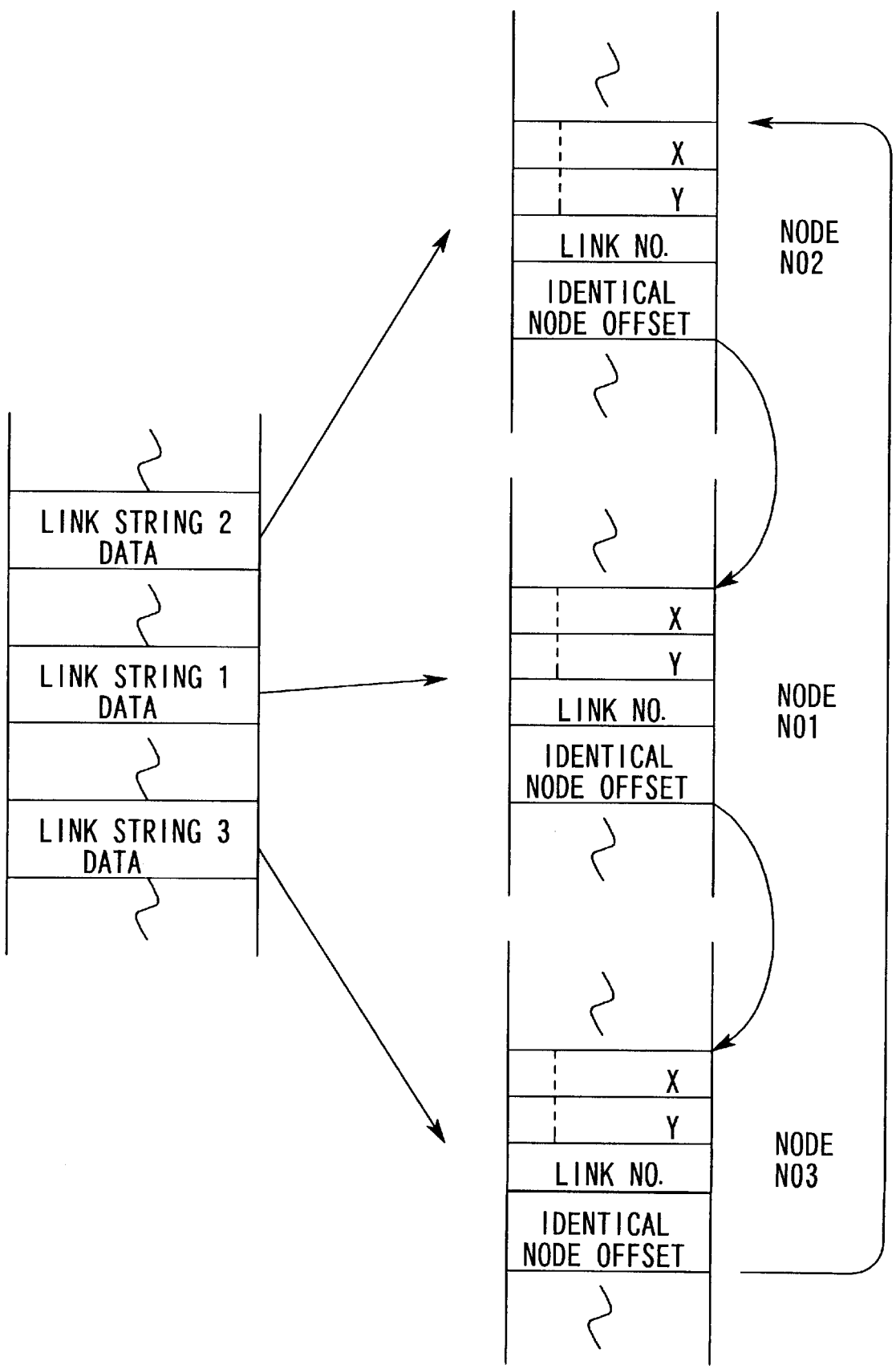
FIG. 7 shows a diagram illustrating offset information that is added into link string data for reading out immediately preceding data.

The identical node offset is explained in detail in reference to FIG. 7. For instance, the address value indicating a storage area for the node information of the node N01 in the link string 1 is stored in memory as the identical node offset of the node N02 in the link string 2. Likewise, the address value indicating the storage area for the node information of the link string 3 is stored in memory as the identical node offset of the node N01 of the link string 1 and the address value of the address at which the node information of the node N02 in the link string 2 is stored in memory as the identical node offset of the node N03 in the link string 3.

Since nodes other than those at intersection, which are indicated as the intersecting points N01–N03 in FIG. 5, do not intersect other roads, a specific value, i.e., FFFFh, for instance, that indicates that no other node exists to constitute an identical node, is stored in the identical node offset storage areas of the node information for these nodes.

Figure 25:
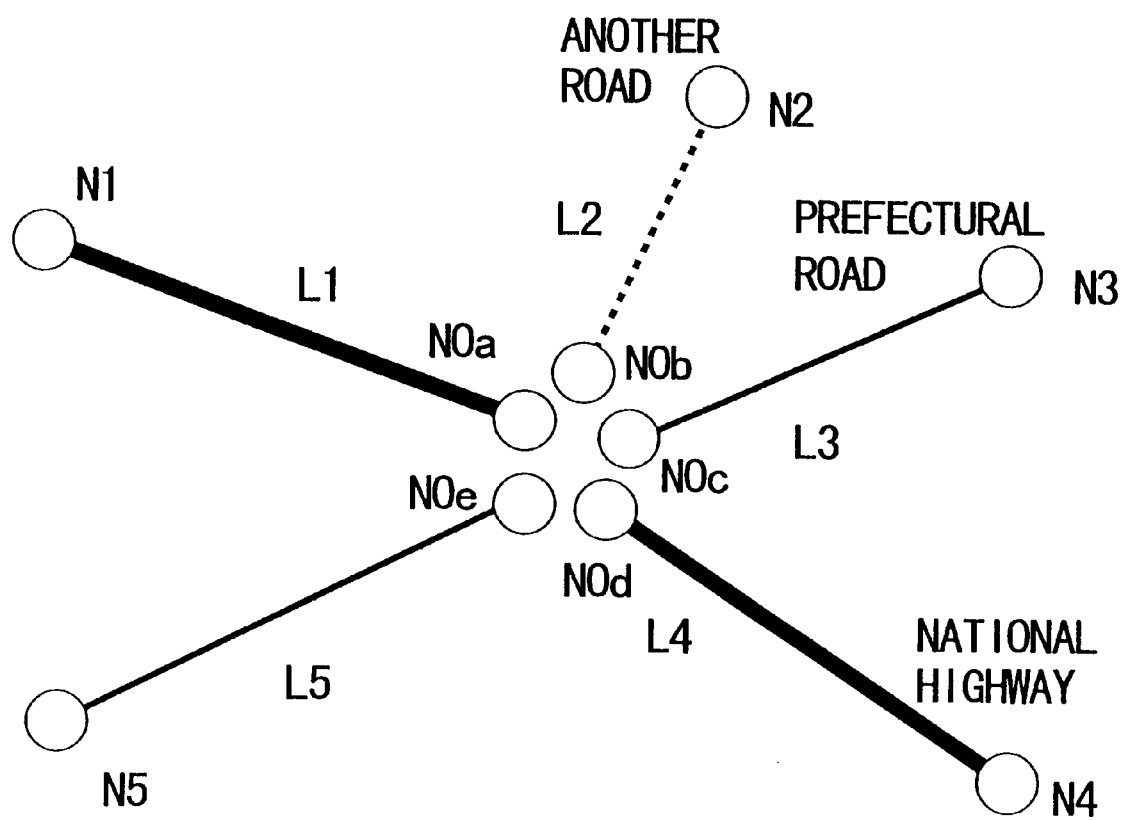
FIG. 25 shows a diagram illustrating an example of the prior art in which the separate segments of a road are assigned to separate links across an intersection.

By providing the identical node offset in this manner, even when there are a plurality of sets of node information in regard to identical nodes, as in the case of an intersection, the corresponding relationships among the individual sets of node information can be easily ascertained. Also, in contrast to an apparatus in the prior art shown in FIG. 25, which requires 5 nodes (N0*a*–N0*d*) corresponding to the intersection where three roads intersect, only three nodes (N01–N03) are required in this embodiment, as shown in FIG. 5, achieving a reduction in the data volume.
(6) Attribute 1

The attribute 1, which is stored together with the X coordinate of a node is constituted of offset information for reading out the link string data in the reverse direction. As explained earlier, in the link string data, the node information and the interpolation point information and the like are positioned in the order in which the actual connections are made. Because of this, by reading out the link string data sequentially from the front end address in the storage area, the road physical form can be accurately ascertained starting at the front end position.

Figure 8:
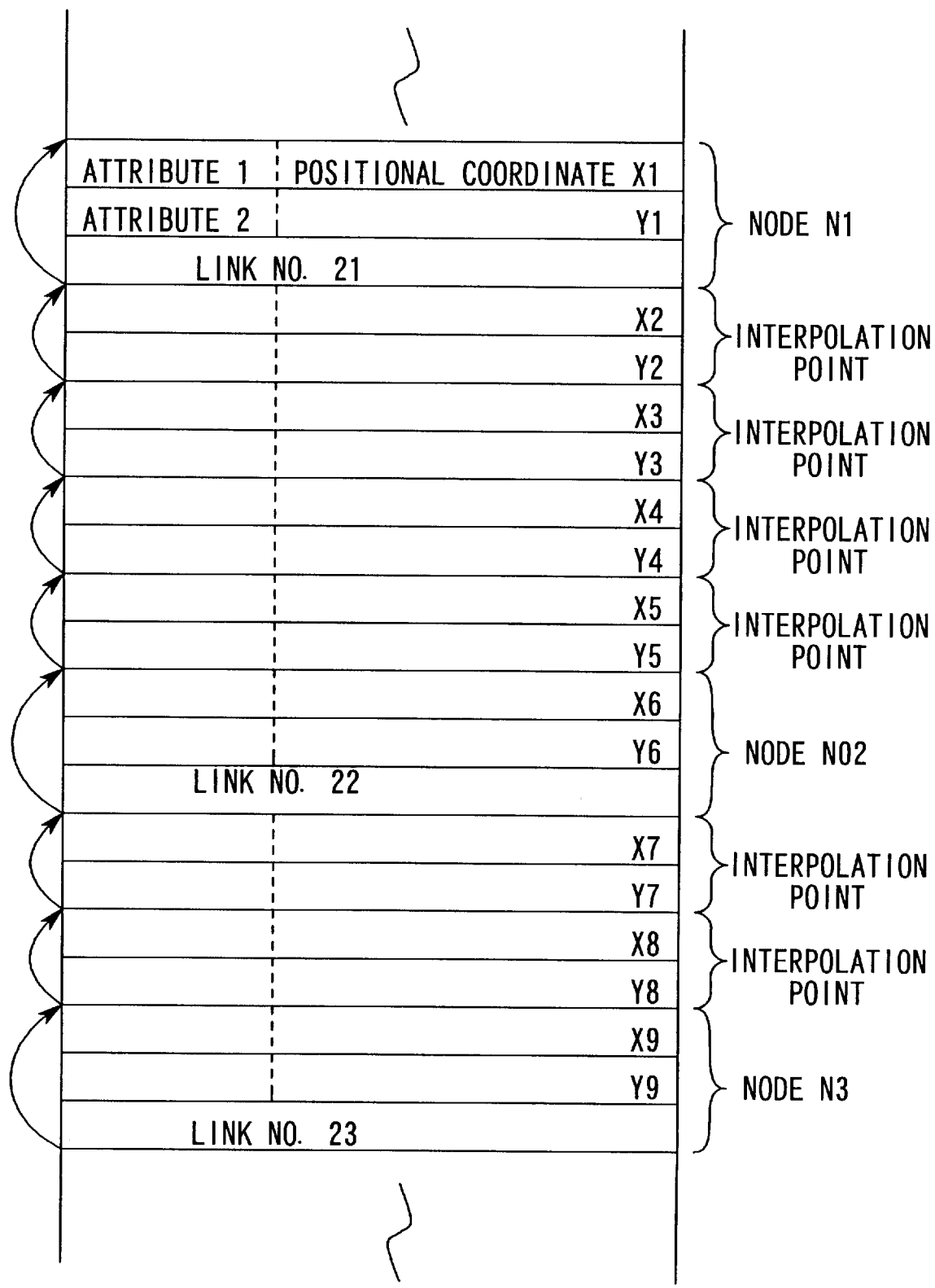
FIG. 8 shows a method for reading out the link string data from the rear end.

There are also situations in which it is necessary to ascertain the road physical forms from the end by reading out the link string data from the end. In such a case, after reading out the node information or the interpolation point information at the rear end, the header position of the node information or the like that is set immediately before in data arrangement must be detected. For instance, when reading out the link string data (FIG. 6) of the link indicated with the bold line in FIG. 5 from the end, it is necessary to first read out the node information on the node N3 and then to detect the header position of the interpolation point information that is set immediately before in the data arrangement to read out the interpolation point information from this header position, as indicated with the arrows in FIG. 8. However, as explained below, the data volume of the node information and the interpolation point information varies among various nodes and interpolation points, and the header positions of node information and interpolation point information cannot be determined uniformly.

FIGS. 9A–9D shows varying data volumes of node information and interpolation point information, with FIG. 9A representing a case in which node information or the like is constituted with two words, i.e., the X and Y positional coordinates, FIG. 9B representing a case in which node information or the like is constituted with three words by adding identical node offset to the two words in FIG. 9A, FIG. 9C representing a case in which node information or the like is constituted of four words by adding guide offset information to the three words in FIG. 9B and FIG. 9D representing a case in which node information or the like is constituted of five words by adding a link no. to the four words in FIG. 9C.

As shown in FIGS. 9A–9D, since the data volume of node information or interpolation point information varies for each case, the information that indicates the header positions of the node information and the interpolation point information is added to the link string data in advance as attribute 1 data in this embodiment. In this embodiment, they are added together with the X positional coordinates of the individual nodes and interpolation points.

For instance, FIG. 10A shows an example in which the X positional coordinates are stored in the lower order 11 bits and information that indicates the header positions of various sets of node information and the like is stored in the higher order 2 bits, in the 2-byte data constituting the attribute 1+X coordinate data. The information that indicates the number of words that are present up to the header position of each set of node information or the like is stored in these higher order 2 bits.

Thus, since the information that indicates the header position of the immediately preceding set of node information or the like is added to the link string data in this embodiment, even when the link string data are read out in the reverse direction, the entire node information or the like can be read out without omissions.

(7) Attribute 2

Figure 11A:
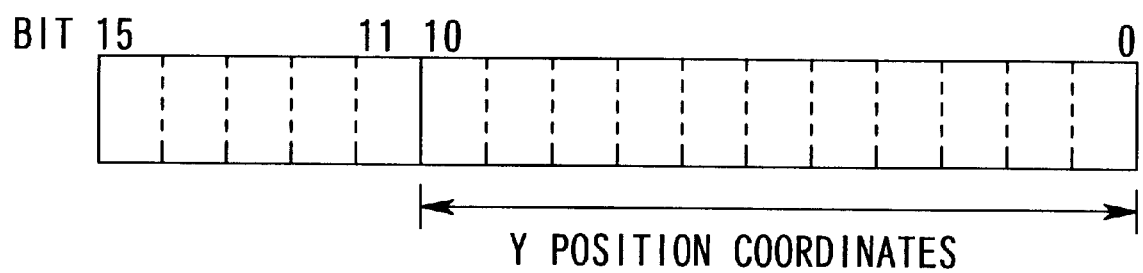

The attribute 2, which is stored together with the Y coordinate of a node, includes traffic regulation information, road width information and number of lanes information. The data length of each set of data of the node link information that constitutes the link string data is 16 bits (2 bytes=1 word). In the lower order 11 bits of the data indicating the attribute 2+Y coordinate, the Y positional coordinates are stored and in the higher order 5 bits, the traffic regulation information, the road width information and the number of lanes information are stored, as shown in FIG. 11A. One type of the information from 1–8 in FIG. 11B is selected through a specific bit combination for the higher order 5 bits.

Since the road width information, the traffic regulation information and the number of lanes information are stored by using the available bits in the 2 byte data for storing the positional coordinates or the like of a node, the road width information, the traffic regulation information and the like can be added to the link string data without having to increase the volume of data.

(8) Altitude information

When displaying a roadmap in three dimensions, data concerning the altitude differences among a plurality of points on the roadmap are required. Accordingly, in this embodiment, all the altitude information on the various links constituting a link string is added at the end of the link string data. It is to be noted that since link string data including altitude information and link string data without altitude information are present together, each set of altitude information can be added to a plurality of nodes and a plurality of interpolation points.

By adding the altitude information to the link string data, a roadmap can be displayed in three dimensions. In addition, since all the altitude information is added together at the end of the link string data, the altitude information can be read out only when it is required and when the altitude information is not required, such as when displaying a regular flat map, for instance, only the data immediately preceding the altitude information need be read out.

[2] Route search data

The route search data include a plurality of sets of data corresponding to a plurality of sets of roadmap display data for different scales, and the data for each scale are referred to as level m (m, may be, for instance, 2, 4) data.

Figure 12:
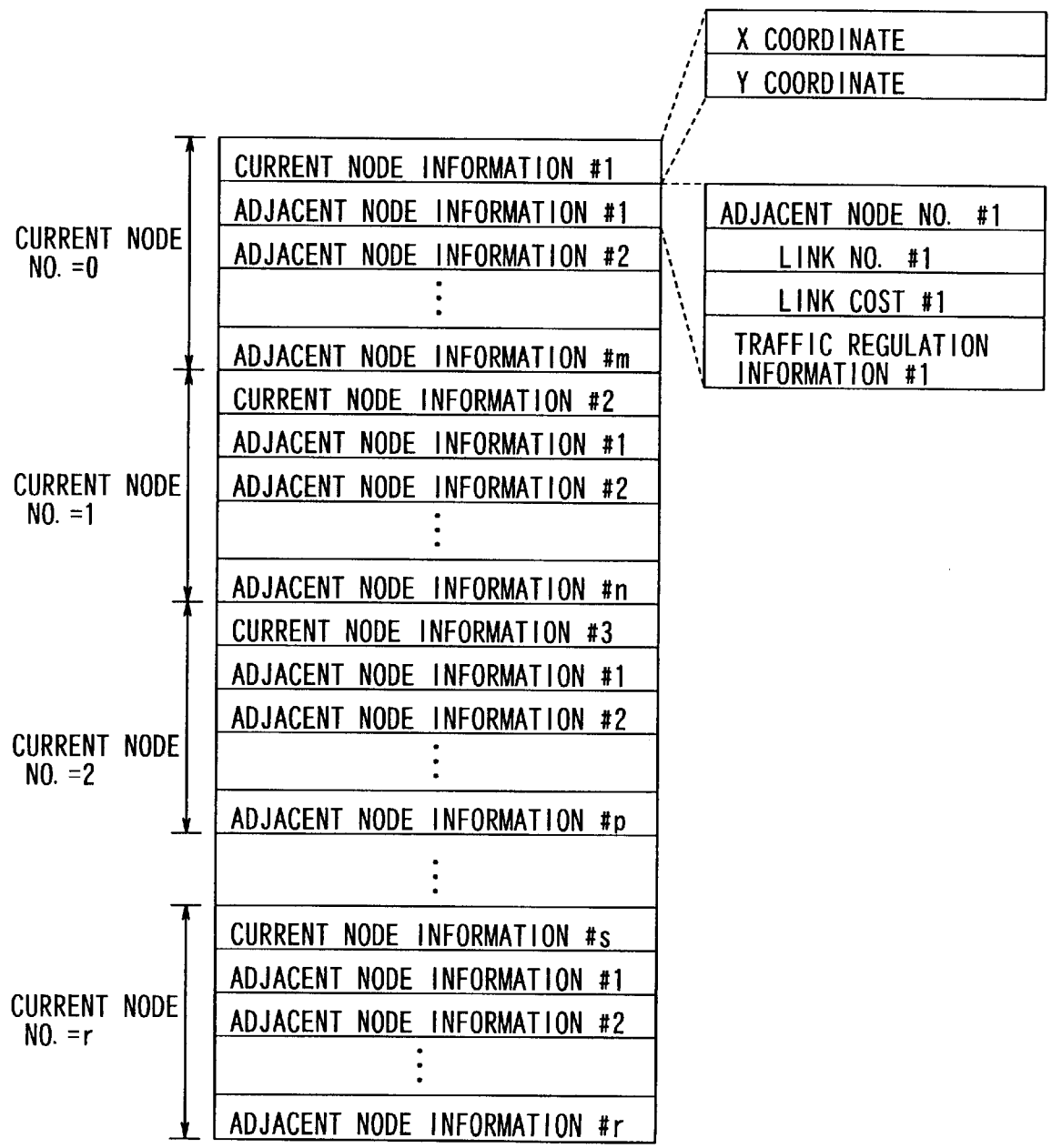
FIG. 12 shows the structure of route search data.

FIG. 12 shows the data structure of route search data. As shown in the figure, in the route search data, node information that indicates the connecting relationship with other nodes is stored for each connecting point (node) of links, which are the minimum units for expressing a road physical form. Each set of node information is constituted with current node information and adjacent node information, with the node positional coordinates stored in the current node information. In the adjacent node information, as shown in the figure, the adjacent node no., the link no. from the current node to the adjacent node, the link cost of the link and traffic regulation information on that link are stored. Also, various sets of node information are stored in the order of link connections and the node no. of the current node can be ascertained by the order in which it is stored. Because of this, even without storing the node nos. of the current nodes as current node information, the node nos. of the current nodes can be ascertained, achieving a reduction in memory requirement.

[3] Level Correspondence Data for Route Search

FIG. 13 shows the data structure of the level correspondence data between levels for route search. The level correspondence data for route search are provided for each mesh at different levels (for instance, meshes M4, M3 and M2 in FIG. 23). FIG. 13 shows the level correspondence data in one mesh, and sets of correspondence information 1~i are provided, the number of which corresponds to the number of nodes present in the mesh. In other words, if there are 10 nodes, i=10. It is to be noted that the mesh code is stored in the mesh code section.

In each of the sets of the correspondence information 1~i, an area for storing current node (home node or self-node) correspondence information and areas for storing information on adjacent nodes #1–#n are provided. The current node correspondence information includes the number of adjacent nodes, current level information related to the current node at the current level and low order level information. The current level information includes the number assigned to the node (referred to as the current node) at the relevant level. The low order level information includes the number assigned to the corresponding node at a low order level and the divided small area number that indicates the small area on a high order level where the current node is present. Each of the sets of information on the adjacent nodes #1–#n includes current level adjacent information and low order level adjacent information. The current level adjacent information includes the number assigned to a node adjacent to the current node at the current level whereas the low order adjacent information includes the node number assigned to a node at a low order level corresponding to the adjacent node and the divided small area number indicating the small area at the high order level where the current node is present.

It is to be noted that FIG. 15 shows direction codes that are used when divided small area numbers are assigned. There is one divided small area at the highest order level n+4, which indicates itself. There are 16 (4×4) divided small areas at level n+3, there are 256 (16×16) divided small areas at level n+2, there are 4096 (64×64) divided small areas at level n+1 and there are 65536 (256×256) divided small areas at the lowest order level n. The adopted longitudinal direction codes and the adopted latitudinal direction codes used for the small area numbers are as shown in the figure. The divided small area number is expressed with two digits of the adopted longitudinal direction code and two digits of the adopted latitudinal direction code, and requires two bytes.

Before entering into further explanation of the divided small area number, the mesh code will be explained below.

Figure 27:
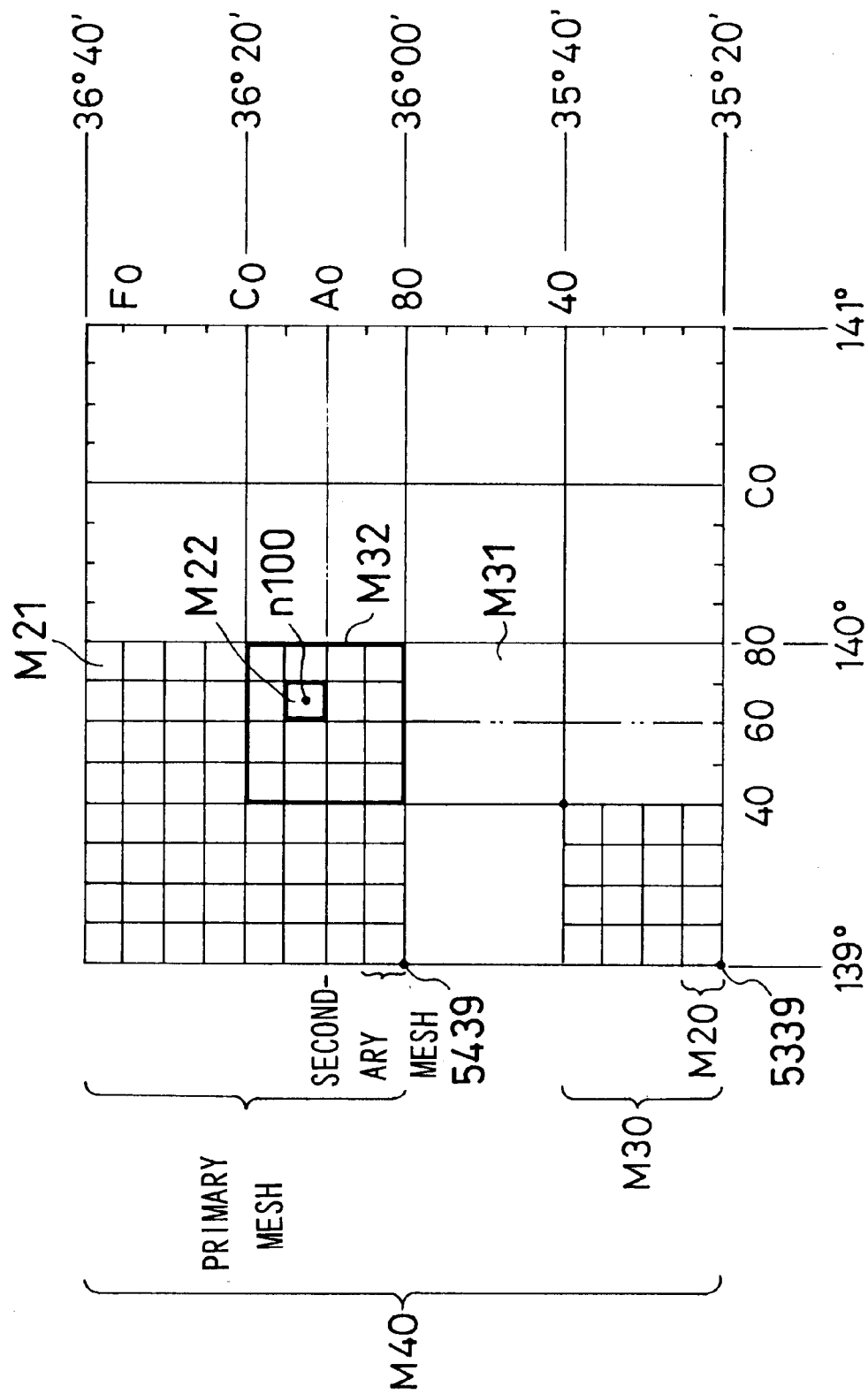
FIG. 27 illustrates assignment of mesh codes.

The mesh is a single range in which road maps are divided into respective fixed ranges as explained above. A mesh code is assigned to respective meshes based on a fixed standard. FIG. 27 is an explanatory figure of the assignment of mesh codes. In FIG. 27, a primary mesh has a size of 40 minutes latitude and 1 degree longitude. The FIG. 27 shows a single mesh M40 at level 4 that consists of four primary meshes. FIG. 27 further expresses a single mesh M30 at level 3 which is generated by dividing the single mesh M40 at level 4 into 16 and a single mesh M20 which is generated by further dividing the single mesh M30 into 16.

The mesh code is expressed by a value based on the latitude and longitude of a point in the lower left corner (the southwest corner) of the mesh. The mesh code for a primary mesh is expressed as a four digit figure comprising two upper digits calculated by multiplying the latitude by 3/2 and two lower digits calculated by subtracting 100 from the longitude. A mesh at level 4 is expressed in four digits using the same calculation of the mesh code for a primary mesh. Thus the mesh code of the mesh M40 at level 4 in FIG. 27 is expressed as 5339 which represents 35° 20"×(3/2)=53 and 139°−100=39. Then a level 4 code is added to create a 6 digit code 5339F4. Since the code is expressed as 1 digit requiring 4 bits, when there are 6 digits, 3 bytes are necessary.

A mesh at level 3 is generated by dividing a primary mesh into quaters. The quarters are designated 00, 01, 10, 11 and these values are added to the primary mesh code. For example, a mesh code of mesh M31 at level 3 in FIG. 27 is expressed by 8 digits 5339F311. F3 represents level 3. In FIG. 27, the secondary mesh is generated by dividing the primary mesh into 8 in the vertical and 8 in the horizontal direction, that is totally 64. Thus the secondary mesh code is represented by the code 00–77 being added to the primary mesh code. For example, the mesh M20 at level 2 is represented by 533900 and then specified as being level 2 by the addition of a code and being represented in 8 digit form as 533900F2. The mesh M21 is represented as 543977F2.

Returning now to the explanation of the divided small area number, the level correspondence data for route searching is data for assigning correspondences regarding which node in which mesh at a lower order level a node in a mesh at a high order level corresponds to. Thus direct use of mesh codes for each level as explained above is the simplest way in order to express a lower order level area. However as explained above a six digit code is required to express the mesh code at level 4 and an eight digit code is required at level 3 and level 2. Furthermore the number of digits increases when going to lower order levels. Thus it is necessary to greatly increase the amount of level correspondence data in order to search a route. In the present embodiment, divided small area numbers using directional codes as shown in FIG. 15 express regions at lower order level in order to express a divided small area at lower order level.

The divided small area, as shown in FIG. 15, is divided each successively lower level into 16 sections. At the lowermost level the original one area is divided into 256×256=65536. By this means the divided small areas can correspond between five levels. This divided small area number expresses a division relative to a reference mesh. For example, a code with a level of n+2 is used in order to express a divided small area at level 2 which is lower by 2 levels relative to a mesh at level 4. A code with a level of N+3 is used in order to express a divided small area at level 1 which is lower by one level relative to a mesh at level 2.

Assuming that a node n100 is present in the mesh M40 at level 4 in FIG. 27, with respect to the mesh M40 at level 4, the small area number at lower order level where the node n100 exists is 8040 at level 3 by using the code with a level of n+3 as shown in FIG. 15. At level 2, the code becomes A060 using the code with a level n+4 as in FIG. 15.

Since a divided small area number is assigned as shown above, it is possible to calculate a mesh code of the corresponding mesh at low order level by a mesh code of a reference mesh and the divided small area number. For example, the mesh code of the mesh M32 at level 3 which corresponds to the node n100 of the mesh M40 at level 4 which has the mesh code of 5339 as shown above in FIG. 27 is 5439F301, and the mesh code of the mesh M22 level 2 is 543926F2. Thus it is possible to perform the calculations with a fixed formula expressing the relationship shown in FIG. 15 and FIG. 27.

The sets of information on adjacent nodes #1–#n are sorted in the order of the numbers assigned to the small areas where the current node at the relevant level is contained and in the order of the node numbers contained in a given individual small area, and are stored in memory in advance. FIG. 14 illustrates how the information is sorted. As shown in FIG. 14A, one mesh M4 at level four is divided into, for instance, 4×4, i.e., 16 small areas, and codes for specifying the individual small areas are assigned as (00, 00), (00, 40), (00, 80) and (00, C0) for the small areas in the lowermost row from left to right, (40, 00) (40, 40) . . . . for the small areas in the row above it and (C0, C0) is assigned to the small area at the right end in the uppermost row. It is assumed that there are two node numbers 0 and 1 present in the small area (00, 00), there are three node numbers 0, 1 and 2 present in the small area (00, 40) and there are four node numbers 0, 1, 2 and 3 present in the small area (00, 80). It is to be noted that the small areas match the mesh M3 at the low order level 3 (see FIG. 23). By this means, time to search data in the table can be reduced.

In this case, as shown in FIG. 14B, the current node correspondence information is sorted in the order of the numbers assigned to the small areas and also in the order of the node numbers of the nodes in a given small area and is stored in memory.

The current node correspondence information and the information on adjacent nodes #1~#n are explained in detail in reference to FIGS. 16 and 17. Let us assume that the adjacent node numbers of three nodes adjacent to the current node assigned with a node number 1000 at level 4 are, for instance, 1100, 1200 and 1300. The number 1000 is stored in memory as the current level node number of the current node correspondence information and the low order level node number 230 is stored in memory as the node number assigned to the node at level 2 that corresponds to the current node. In addition, if it can be assumed that the node 230 at level 2 is identical to the node n100 shown in FIG. 27, A060 is stored in memory as the divided small area number to be stored.

As the information on adjacent node #1, the node number 1100 assigned to the node adjacent to the node 1000 at level 4 is stored in memory as the current level node number, and the low order level node number 231 is stored in memory as the node number assigned to the node that is the closest to the node 230 among a plurality of nodes on a link Lb at level 2 that corresponds to the link LB between the nodes 1000 and 1100. In addition, A060 is stored in memory as the number of the divided small area where the node assigned with the adjacent node number 231 at level 2 is stored.

Furthermore, as for the information on adjacent node #3, the node number 1300 of the node adjacent to the node 1000 at level 4 is stored in memory as the current level node number, and the low order level node number 354 is stored in memory as the node number assigned to the node that is the closest to the node 230 among a plurality of nodes on a link La at level 2 that corresponds to the link LA between the nodes 1000 and 1300. In addition, A060 is stored in memory as the number of the divided small area where the node assigned with the adjacent node number 354 at level 2 is stored.

[4] Recommended route data

Figure 18:
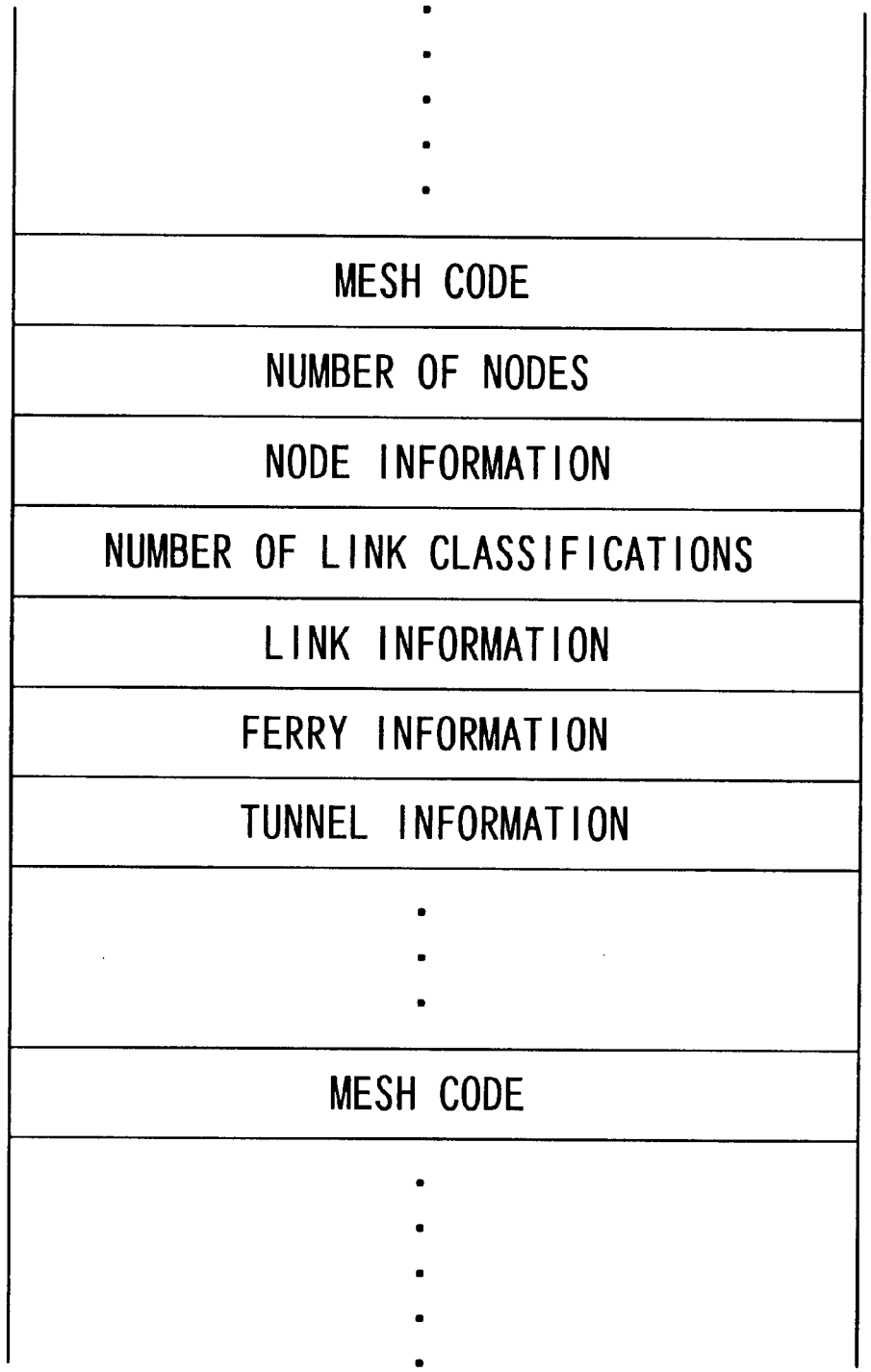
FIG. 18 shows an overview of the structure in the recommended route data.

FIG. 18 shows an outline of the data structure of recommended route data which represent a recommended route from a point of departure to a destination which has been searched based upon the route search data. In the recommended route data, node information and link information on the recommended route are stored, while classified in units of mesh ranges.

Figures 19A, 19B:
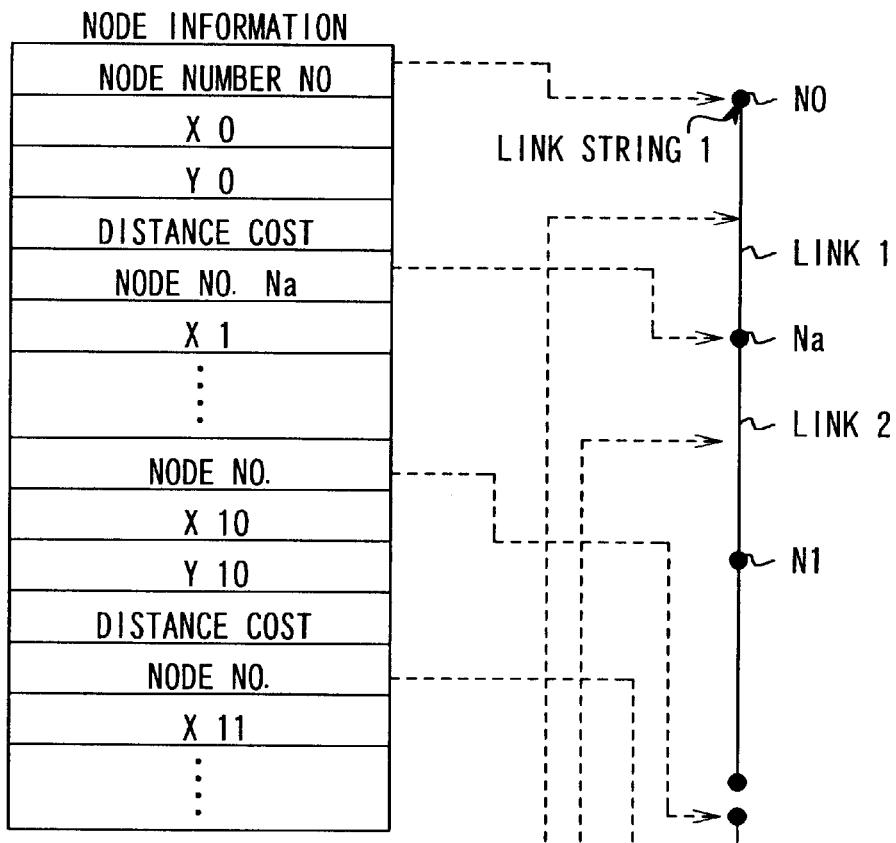
FIGS. 19A and 19B show a detailed diagram illustrating the data structure of the node information and the link information in the recommended route data.

As shown in FIG. 18, the recommended route data are constituted with a mesh code, the number of nodes, node information, the number of link classifications, link information, ferry information and tunnel information. The number for identifying the mesh range is stored in the storage area for the mesh code, the number of nodes present within a mesh range is stored in the storage area for the number of nodes and, as shown in detail in FIG. 19A, the node no., the positional coordinates, the distance cost and the like of each node within a mesh range are stored in the storage area for the node information. In addition, the number of link classifications that are present inside a mesh range is stored in the storage area for the number of link classifications and, as shown in detail in FIG. 19B, the link classification, the number of links, the link no. and the like of each link within a mesh range are stored in the storage area for the link information. FIGS. 19A and 19B illustrate a case in which there are two link strings 1 and 2 within the area indicated by the same mesh code.

The following is an explanation of the operation of the embodiment in reference to a flowchart. In this embodiment, a recommended route is determined and displayed on the display device 6 in the following manner. The route search using the level 2 roadmap data and the level 4 roadmap data is implemented as explained below.

Figure 20:
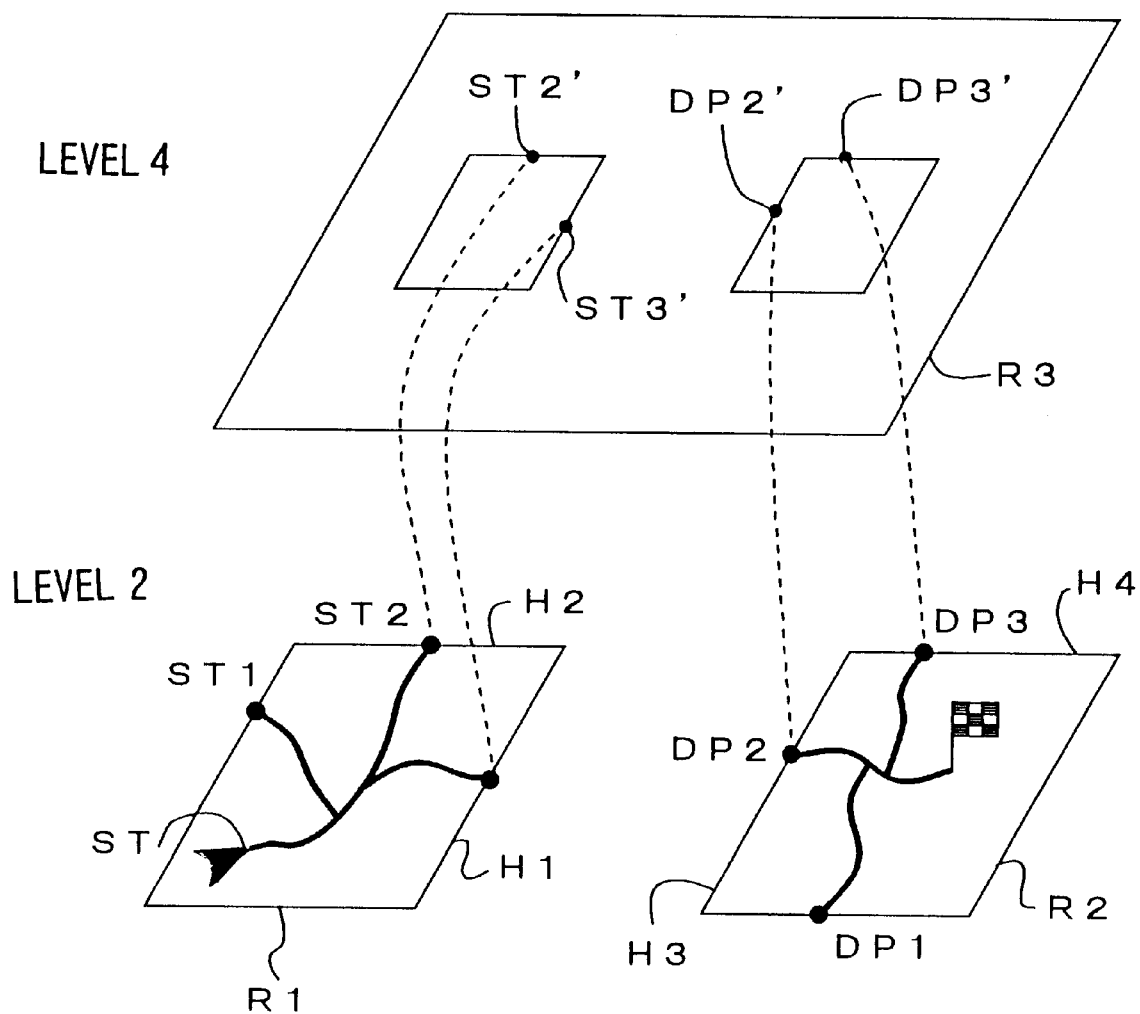
FIG. 20 illustrates route search using level 4 and level 2 data

The route search processing is explained in detail in reference to FIG. 20.

1. A specific area R1 (50 kilometer×50 kilometer area, for instance) is set in the vicinity of the point of departure at level 2.

2. Roads that are likely to be connected to the destination with the point of departure ST (current position) set as the start point within the specific area are extracted and end point nodes ST1~ST3 within the specific area are determined. In addition, from these end point nodes, the nodes ST2 and ST3 that are adjacent to the two sides H1 and H2 facing toward the destination among the four sides defining the specific area are selected as high order correspondence end point nodes.

3. A specific area R2 (50 kilometer×50 kilometer area, for instance) is set in the vicinity of the destination at level 2.

4. Roads that are likely to be connected to the point of departure with the destination DP set as the start point within the specific area are extracted and end point nodes DP1~DP3 within the specific area are determined. In addition, from these end point nodes, the nodes DP2 and DP3 that are adjacent to the two sides H3 and H4 facing toward the point of departure among the four sides defining the specific area are selected as high order correspondence end point nodes.

5. A specific area R3 that contains the point of departure and the destination is set as the route search area at level 4.

6. Nodes ST2' and ST3' at level 4 that correspond to the plurality of high order correspondence end nodes ST2 and ST3 selected within the specific area in the vicinity of the point of departure are detected as start point nodes at level 4 and nodes DP2' and DP3' at level 4 that correspond to the plurality of high order correspondence end nodes DP2 and DP3 selected within the specific area in the vicinity of the destination are detected as end point nodes at level 4.

7. Roads that connect the plurality of start point nodes ST2' and ST3' and the plurality of end point nodes DP2' and DP3' at level 4 are searched.

8. The distances between the point of departure ST and the selected high order correspondence end point nodes ST2 and ST3 at level 2, the distances between the start point nodes ST2' and ST3' at level 4 and the end point nodes DP2' and DP3' and the distances between the destination DP and the selected high order correspondence end point nodes DP2 and DP3 at level 2 are individually added and route with the shortest distance, for instance, is determined as the recommended route.

Figure 21:
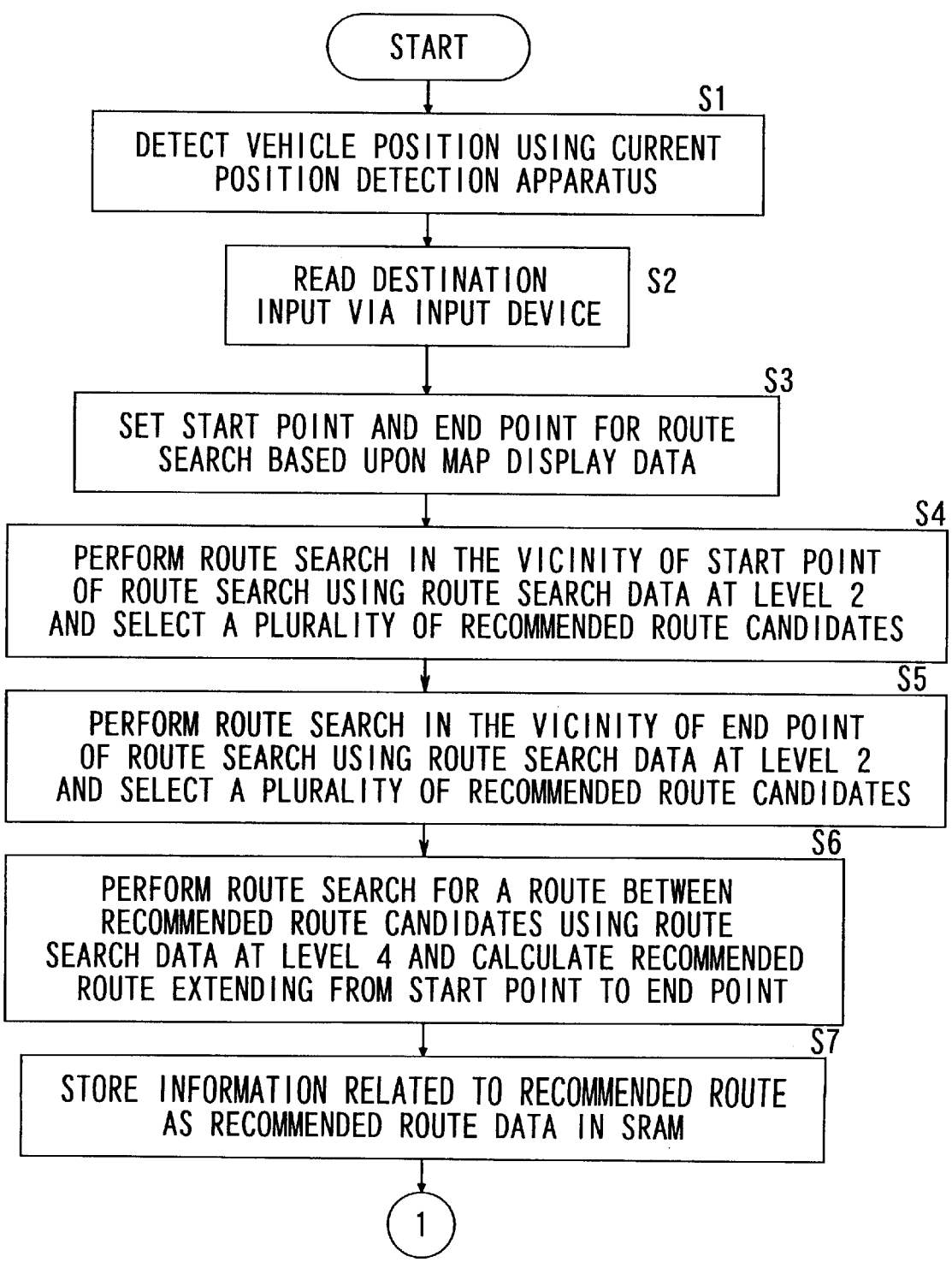
FIG. 21 shows a flowchart outlining the main processing performed by the control circuit.
Figure 22:
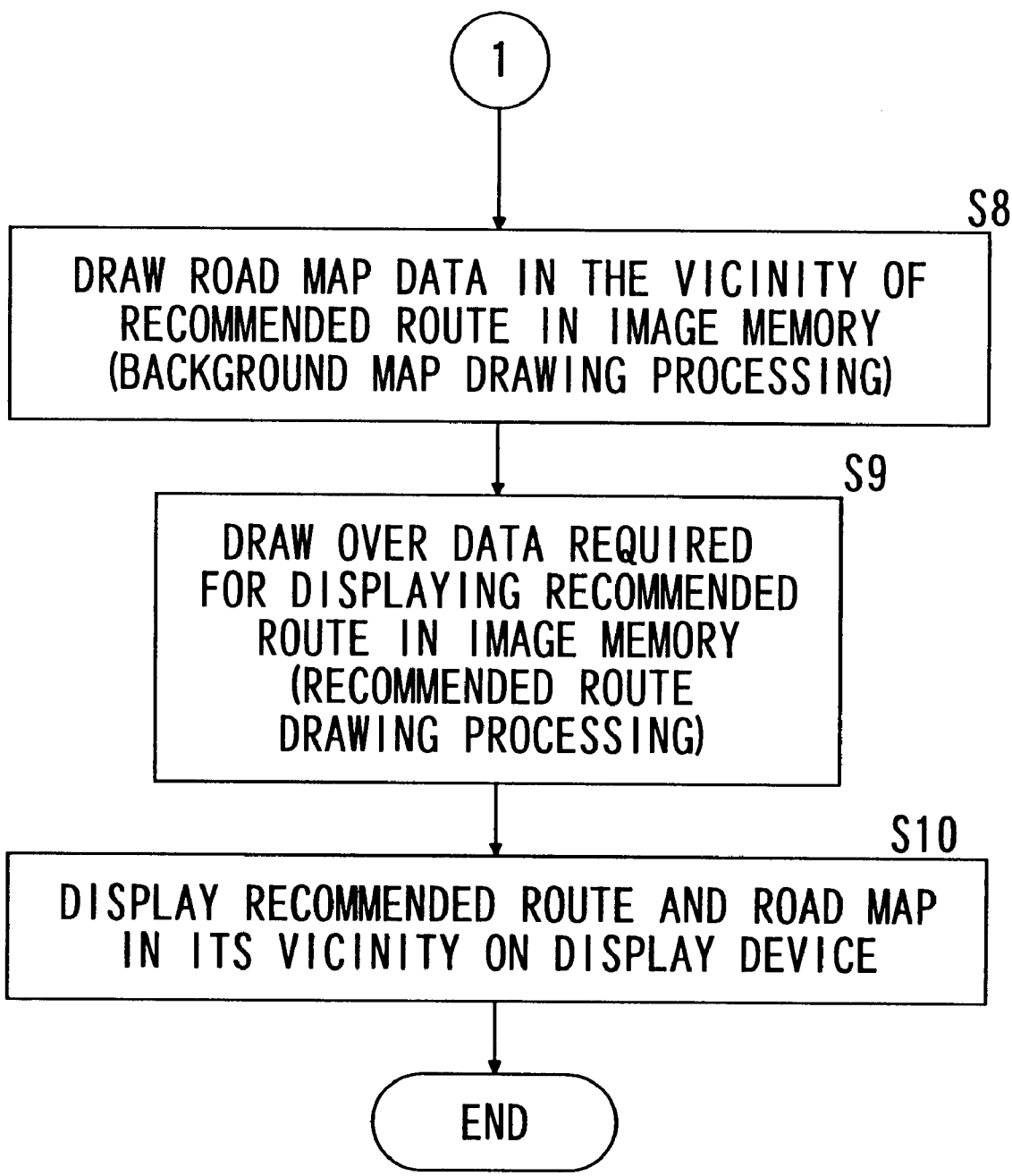
FIG. 22 shows the flowchart continuing from FIG. 21.

FIGS. 21 and 22 are a flow chart illustrating the outline of the main processing performed by the control circuit 2. In step S1 in FIG. 21, the vehicle position is detected by the current position detection apparatus 1. In step S2, the destination, which has been input via the input device 3, is read in. In step S3, based upon the map display data stored in the map database apparatus 8, the start point and the end point of the route search are set on roads for which route search is possible. For instance, the start point of a vehicle may be the current position of the vehicle (vehicle position) and the end point is the destination.

In step S4, using route search data at level 2, route search in the vicinity of the start point of the route search is performed, and a plurality of candidates for the recommended route in the vicinity of the start point are selected. In step S5, using route search data at level 2, route search in the vicinity of the end point of the route search is performed, and a plurality of candidates for the recommended route in the vicinity of the end point are selected.

In step S6, using route search data at level 4, route search is performed for routes between the candidates for the recommended routes selected in step S4 and step S5, and a recommended route from the start point to the end point is calculated.

Route search data at different levels are used for the vicinities of the start point and the end point, and the middle range between the start point and the end point in this manner because if route search is performed using route search data at level 2 for the entire route, the data quantity will be very large and, as a result, the calculation time required in route search will increase. In step S7, the information related to the recommended route calculated in step S6 is stored in the SRAM 7 as recommended route data.

When the processing performed in step S7 in FIG. 21 is completed, the operation proceeds to step S8 shown in FIG. 22, in which the background map drawing processing is performed to draw (store) data related to the roadmap in the vicinity of the recommended route in the image memory 5 for display on the display device 6. Next, the operation proceeds to step S9 in which the data required to display the recommended route calculated in step S3 are also drawn over (stored) in the image memory 5. In step S10, the data stored in the image memory 5 are read out and the recommended route and the roadmap in the vicinity are displayed on the display device 6.

As shown in FIG. 12, the route search data and the recommended route data in this embodiment hold only the link connection information and they do not hold information related to road forms. Consequently, the form data are extracted from the roadmap data based upon the recommended route data in order to draw the recommended route superimposed upon the roadmap on the monitor.

In this embodiment, the route search is performed using the route search data and the level correspondence data for route search. The route search data include current node information related to the current node and adjacent information related to adjacent nodes that are adjacent to the current node for each node at each level. The level correspondence data for route search include current node correspondence information, each set of which comprises current level information related to the current node at a given level and low order level information related to the node at the low order level corresponding to the current node. Also the level correspondence data for route search include adjacent node information, each set of which comprises current level adjacent information related to adjacent nodes that are adjacent to the current node and low order level adjacent information related to adjacent nodes that are adjacent to the node at the low order level corresponding to the current node. Since the information for directly specifying a high order level from a low order level is not stored in memory in the level correspondence data and only the information for directly specifying a low order level from a high order level is stored in memory in the level correspondence data, the required data capacity is reduced. Furthermore, the correspondence data at the lowest order level are not required, thereby achieving further reduction in the data volume required.

The assignment of correspondences with nodes from a low order level to a high order level is calculated by calculating the mesh code of high order levels at which the node exists from the low order level mesh code and then by calculating the number of the divided small area at which the current node exists in the mesh at high order level. Level correspondence data of the mesh that corresponds to the calculated mesh code at higher order level is searched with the current node number and the calculated divided small area number. Thus it is possible to assign correspondences with node numbers of high order level meshes. For example, it will be explained with reference to FIG. 16 that a higher order node 1000 at level 4 which corresponds to a node 230 at level 2 is discovered from the node 230. Firstly, if it is assumed that the level 2 mesh code is 543926F2 of the mesh M22 given as an example in FIG. 27, the mesh code of the corresponding mesh at level 4 is calculated by the upper 4 digits of the level 2 mesh code as 5339F4. That is to say, it is the mesh M40. Furthermore the divided small area number in the mesh M40 which corresponds to the level 2 mesh code 543926F2 is calculated as A060. If the level correspondence data for route searching (FIG. 17 and FIG. 13) that the mesh M40 of the calculated mesh code 5339F4 at high order level has is searched with keys of the current node number 230 and the calculated divided small area number A060, a node 1000 can be found as the corresponding node.

The reduction of required memory capacity is explained in further detail.

Figure 23:
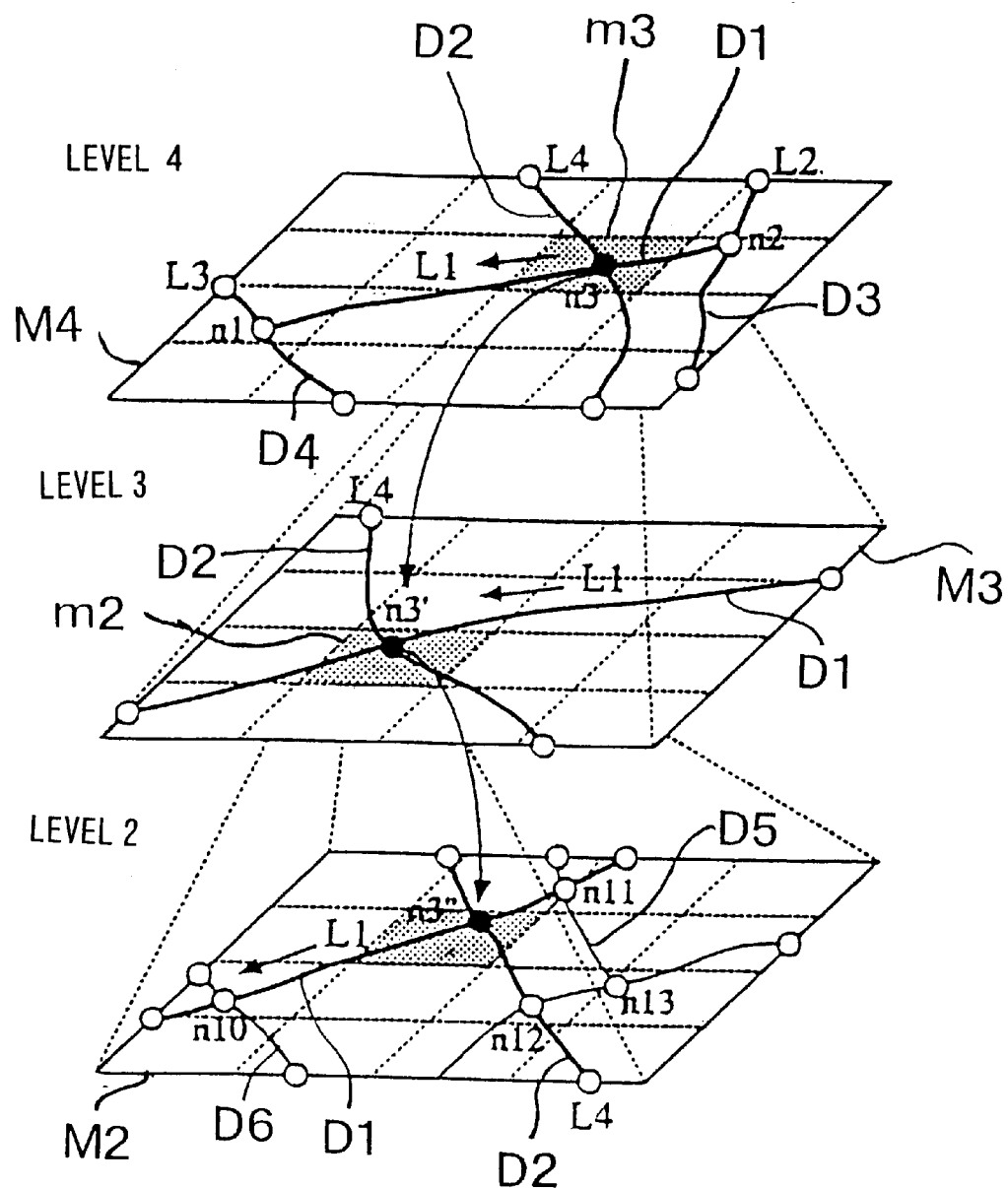
FIG. 23 illustrates roads at levels 4, 3 and 2

In FIG. 23, if the node n3" in the mesh M2 at level 2 is assigned as a high order correspondence end point node selected at level 2, only the node number assigned to the node n3 at level 4 corresponding to the node n3" at level 2 needs to be stored in memory together with the node number assigned to the node n3" at level 2 in order to detect the node corresponding to the node n3" from the route search data at level 4, i.e., in order to search the corresponding node at a high order level from a low order level. In the reverse case, in which a corresponding node at a low order level is to be searched from a high order level, i.e., the node n3" at level 2 corresponding to the node n3 is to be detected from route search data at level 2, only the node number assigned to the node n3" at level 2 corresponding to the node n3 at level 4 needs to be stored in memory together with the node number assigned to the node n3 at level 4.

However, the following problem arises when establishing correspondence with a node at a low order level from a high order level. In FIG. 23, the mesh M4 at level 4 is divided into 16 small areas, requiring level 3 data corresponding to the individual small areas. Consequently, the data corresponding to the mesh M4 at level 4 are stored in memory at level 3 as data corresponding to 16 meshes. With these 16 meshes assigned with mesh numbers M3_1–M3_16, node numbers 1~Q are assigned to the plurality of nodes present in each of the meshes M3_1–M3_16. In other words, the same numbers are used as node numbers throughout the meshes M3_1–M3_16. The same principle applies to the relationship between the data at level 3 and at level 2, and each of the 16 meshes M3_1–M3_16 at level 3 corresponds to 16 meshes at level 2. For instance, meshes M2_1_1–M2_1_16 correspond to the mesh M3_1, and meshes M2_2_1–M2_16_16 correspond to the meshes M3_2~M3_16. In other words, the same node numbers are used throughout the meshes M2_1_1–M2_16_16. As a result, the node n3" at the low order level 2 corresponding to the node n3 at the high order level 4 cannot be specified from the high order level simply with the node number.

To give a more detailed explanation on this point, when the node at level 2 corresponding to the node with node number 1 in the small area m4 at level 4 is assigned with the node number 17, there is a possibility that there are nodes assigned with the node number 17 present in the individual meshes at level 2 corresponding to the other 15 small areas at level 4. Consequently, the node at the low order level 2 cannot be specified simply with the node number 17. While nodes can be specified simply by using the node numbers if node numbers are assigned sequentially throughout all the levels, it will require that several millions of node numbers be assigned nationwide, resulting in a massive amount of required memory capacity.

In contrast, since the map database apparatus in this embodiment uses the level correspondence data for route search described above, correspondences from a low order level to a high order level and from a high order level to a low order level can be achieved by only the correspondence in which a low order level is specified from a high order level is required, as a result a reduction in the memory requirements is achieved.

In the present embodiment, since the low order level adjacent data is recorded in the level correspondence data while corresponding with the current level adjacent data, it is possible to search a route with high reliability by assigning correspondences to adjacent data between levels when conducting a route search calculation. For example, when the environs of a departure point are searched at level 2 and the route search is performed at level 4 after a certain node, a corresponding node at level 4 is found by the level correspondence data for searching a route as discussed above. After that node, the route is searched with level 4 data. At this time, if it is realized that the route to arrive at that node has already been searched at a low order level, when commencing a search from the node at a high order level, the route need not be searched as a route to be selected under exactly the same conditions as other routes. Searching the route under exactly the same conditions as other routes results in a waste of searching time and may result in a search result such as making a U turn and returning to a departure point. If the corresponding relationship of the most adjacent node on the corresponding route is understood, the route can be ascertained in order to determine that the route search to arrive at a certain node has been completed. The reason why information relating to the most adjacent node is provided is that the amount of information contained between nodes is different between levels. Between nodes which are adjacent to each other in a high order level, further new nodes may be contained at a low order level. It is also possible to provide linking data such as connecting link numbers instead of adjacent node information.

INDUSTRIAL APPLICABILITY

In the above embodiment, level correspondence data for searching a route is expressed by a divided small area number in order to indicate a divided small area at low order level. However as explained above, mesh codes from each level may also be directly used. A large amount of data is necessary but as it is not necessary to perform calculations, the program is simplified.

Figure 26:
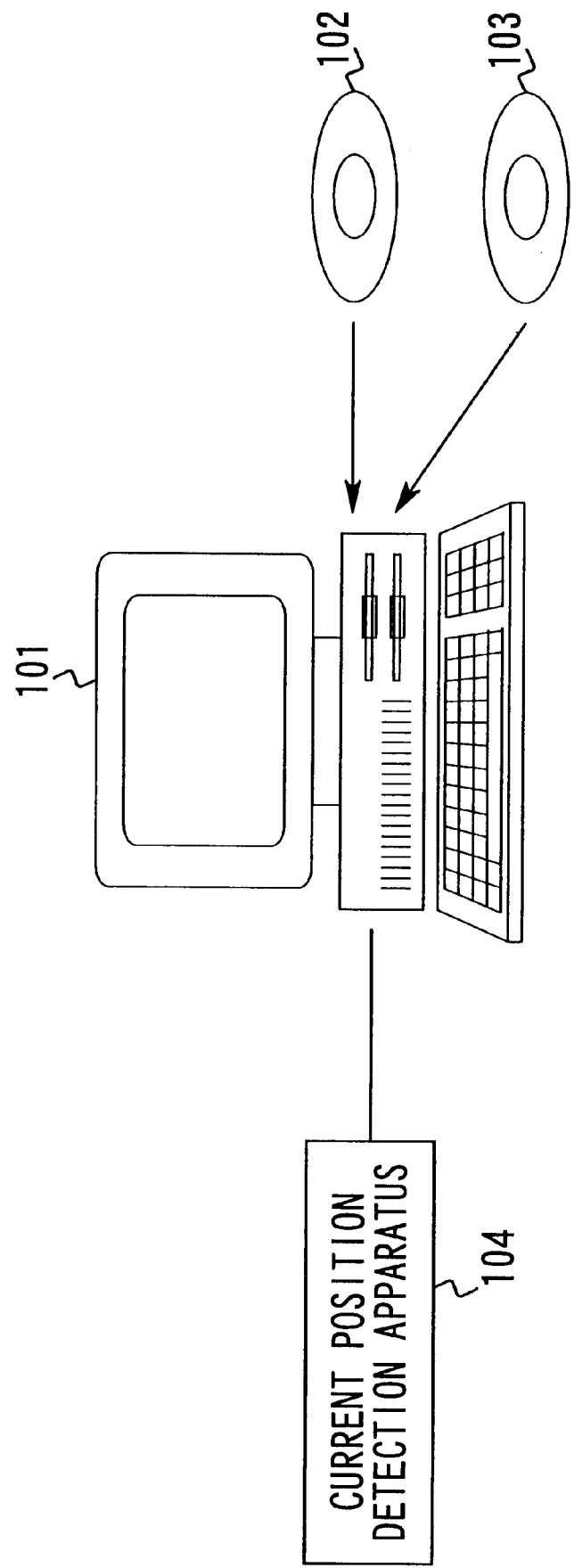
FIG. 26 shows a case in which the navigation system is achieved by a computer.

In the above embodiment, an example of a map navigation system for vehicles is shown in FIG. 1. However the invention is not limited in this respect. For example, as shown in FIG. 26, a control program may be read from a recording medium mounting the control program of a navigation system in a computer 101 such as a personal computer. By executing the control program, it is possible to construct a equivalent system as the map navigation system for vehicles in the present embodiment In this case, a map data base shown in the present embodiment may be read from the recording medium 103. Furthermore necessary devices to construct a navigation system such as a current position detection apparatus 104 may be connected to an outer port of the computer 101.

I claim:

1. A map database apparatus in which a road is expressed by using a plurality of sets of data related to links each of which links has nodes at a front end and at a rear end, data related to a plurality of links provided separately for maps at different scales are respectively stored as roadmap data from a highest order level at a smallest scale through a lowest order level at a largest scale, a map area at a high order level is divided into a plurality of M small areas, each of sets of detail information corresponding to said M small areas is stored as a set of roadmap data of a map area at a low order level, and M sets of roadmap data are stored at the low order level, wherein:

correspondence information between nodes at different levels when said low order level is viewed from said high order level is provided as level correspondence data that express corresponding relationships between roadmap data at said high order level at the small scale and roadmap data at said low order level at the large scale.

2. A map database apparatus according to claim 1, wherein:

said level correspondence data is information in which
1) a number assigned to a high order node at said high order level,
2) a number assigned to a low order node at a low order level corresponding to said high order node, and
3) a number of said small area at said low order level where said low order node is present
are provided so as to correspond with one another, at each level excluding a lowest order level.

3. A map database apparatus according to claim 1, wherein:

said level correspondence data at each level are sorted in an order of numbers assigned to said small areas that contains said high order level node and also in an order of numbers assigned to nodes contained in a single small area.

4. A map database apparatus according to claim 1, wherein:

said level correspondence data are route search data that are provided with a number assigned to a high order adjacent node that is adjacent to a current node at a high order level and a number assigned to a low order adjacent node that is adjacent to said current node at a low order level corresponding to said current node at said high order level made to correspond with each other.

5. A map database apparatus according to claim 1, wherein:

said level correspondence data is information in which
1) an identification assigned to a high order node at said high order level,
2) an identification assigned to a low order node at a low order level corresponding to said high order node, and
3) an identification of said small area at said low order level where said low order node is present
are provided so as to correspond with one another, at each level excluding a lowest order level.

6. A map database apparatus according to claim 2, wherein: said number of said small area at the low order level is a relative number of small area referring to said map area at the high order level as a reference.

7. A map database apparatus according to claim 2, wherein: a numbering system of said small areas at said low order level is a system so that a number of said map area at the high order level can be specified based upon said number of said small area.

8. A map database apparatus according to claim 5, wherein: an identification system of said small areas at said low order level is a system so that an identification of said map area at the high order level can be specified based upon said identification of said small area.

9. A map database apparatus in which a road is expressed by using a plurality of sets of data related to links each of which links has nodes at a front end and at a rear end, data related to a plurality of links provided separately for maps at different scales are respectively stored as roadmap data from a highest order level at a smallest scale through a lowest order level at a largest scale, a map area at a high order level is divided into a plurality of M small areas, each of sets of detail information corresponding to said M small areas is stored as a set of roadmap data of a map area at a low order level, and M sets of roadmap data are stored at the low order level, wherein:

1) a number assigned to a high order current node at said high order level and a number assigned to a low order current node at said low order level corresponding to said high order current node, made to correspond with each other; and
2) a number assigned to a high order adjacent node connected to said high order current node and a number assigned to a low order adjacent node connected to said low order current node, made to correspond with each other;

are provided as level correspondence data that indicate corresponding relationships between roadmap data at said high order level at a small scale and roadmap data at said low order level at a large scale, for each level excluding a lowest order level.

10. A map database apparatus according to claim 5, wherein:

said level correspondence data at each level are sorted in an order of numbers assigned to said small areas that contains said high order level node and also in an order of numbers assigned to nodes contained in a single small area.

11. A recording medium recording map database in which a road is expressed by using a plurality of sets of data related to links each of which links has nodes at a front end and at a rear end, data related to a plurality of links provided separately for maps at different scales are respectively stored as roadmap data from a highest order level at a smallest scale through a lowest order level at a largest scale, a map area at a high order level is divided into a plurality of M small areas, each of sets of detail information corresponding to said M small areas is stored as a set of roadmap data of a map area at a low order level, and M sets of roadmap data are stored at the low order level, wherein:

correspondence information between nodes at different levels when said low order level is viewed from said high order level is provided as level correspondence data that express corresponding relationships between roadmap data at said high order level at the small scale and roadmap data at said low order level at the large scale.

12. A navigation apparatus, comprising:

a map database device in which a road is expressed by using a plurality of sets of data related to links each of which links has nodes at a front end and at a rear end, data related to a plurality of links provided separately for maps at different scales are respectively stored as roadmap data from a highest order level at a smallest scale through a lowest order level at a largest scale, a map area at a high order level is divided into a plurality of M small areas, each of sets of detail information corresponding to said M small areas is stored as a set of roadmap data of a map area at a low order level, and M sets of roadmap data are stored at the low order level; and a control device that performs route searching and controls a monitor to display a road map and a result of route searching by using database in said map database device, wherein:

in said map database device, correspondence information between nodes at different levels when said low order level is viewed from said high order level is provided as level correspondence data that express corresponding relationships between roadmap data at said high order level at the small scale and roadmap data at said low order level at the large scale.

* * * * *

UNITED STATES PATENT AND TRADEMARK OFFICE
CERTIFICATE OF CORRECTION

PATENT NO. : 6,023,655
DATED : February 8, 2000
INVENTOR(S) : Takashi Nomura

It is certified that error appears in the above-identified patent and that said Letters Patent is hereby corrected as shown below:

On the title page, item

[63] Change the Related U.S. Application Data from "Continuation of application No. PCT/JP97/00004, Dec. 16, 1997." to --Continuation of application No. PCT/JP97/04621, Dec. 16, 1997--.

Signed and Sealed this

Third Day of April, 2001

Attest:

NICHOLAS P. GODICI

Attesting Officer     Acting Director of the United States Patent and Trademark Office